United States Patent
Ganesh et al.

(10) Patent No.: US 6,295,610 B1
(45) Date of Patent: Sep. 25, 2001

(54) RECOVERING RESOURCES IN PARALLEL

(75) Inventors: Amit Ganesh, Mountain View; Gary C. Ngai, Saratoga, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/156,551

(22) Filed: Sep. 17, 1998

(51) Int. Cl.$^7$ .................................................. G06F 11/14
(52) U.S. Cl. ............................................. 714/19; 707/202
(58) Field of Search .................... 714/16, 19; 707/202

(56) References Cited

U.S. PATENT DOCUMENTS

| | | | |
|---|---|---|---|
| 5,065,311 | 11/1991 | Masai et al. | 395/182.18 |
| 5,155,678 | 10/1992 | Fukumoto et al. | 395/425 |
| 5,170,480 * | 12/1992 | Mohan et al. | 395/600 |
| 5,201,044 | 4/1993 | Frey, Jr. et al. | 395/800 |
| 5,280,611 | 1/1994 | Mohan et al. | 395/182.18 |
| 5,333,303 | 7/1994 | Mohan | 395/182.18 |
| 5,333,314 * | 7/1994 | Masai et al. | 395/600 |
| 5,335,343 | 8/1994 | Lampson et al. | . |
| 5,440,727 | 8/1995 | Bhide et al. | 395/444 |
| 5,481,699 | 1/1996 | Saether | 395/182.18 |
| 5,485,608 | 1/1996 | Lomet et al. | 395/600 |
| 5,524,205 | 6/1996 | Lomet et al. | 395/182.14 |
| 5,524,239 | 6/1996 | Fortier | 395/600 |
| 5,524,241 | 6/1996 | Ghoneimy et al. | 395/182.18 |
| 5,551,046 | 8/1996 | Mohan et al. | 395/800 |
| 5,561,795 | 10/1996 | Sarkar | 395/600 |
| 5,596,710 * | 1/1997 | Voigt | 714/19 |
| 5,630,047 | 5/1997 | Wang | 395/182.18 |
| 5,734,817 | 3/1998 | Roffe et al. | 395/182.13 |
| 5,850,507 | 12/1998 | Ngai et al. | . |
| 5,857,204 * | 1/1999 | Lordi et al. | 707/202 |
| 5,933,838 | 8/1999 | Lomet | . |
| 6,067,550 | 5/2000 | Lomet | . |
| 6,185,577 * | 2/2001 | Nainani et al. | 707/202 |
| 6,185,699 * | 2/2001 | Haderle et al. | 714/19 |

OTHER PUBLICATIONS

Mohan, et al., Aries–RRH: Restricted Repeating of History in TEH Aries Transaction Recovery Method, Data Engineering, $7^{th}$ International Conference IEEE, pp. 718–727. Dec. 1991.

Microsoft Press, "Microsoft Press Computer Dictionary, Third Edition," p. 408, Sep. 1997.

Oxford University Press, "Dictionary of Computing, Fourth Edition," pp. 125, 299. Dec. 1996.

IBM Corp., IBM Technical Disclosure Bulletin, vol. 28, No. 3, pp. 950–951. Dec. 1991.

* cited by examiner

*Primary Examiner*—Dieu-Minh Le
*Assistant Examiner*—Scott Baderman
(74) *Attorney, Agent, or Firm*—Hickman Palermo Truong & Becker LLP; Carl L. Brandt

(57) ABSTRACT

A method and apparatus for removing changes made by a particular transaction is provided. According to one aspect, two or more sets of changes that were made by a particular transaction that can be removed in parallel are identified. A corresponding recovery process is assigned to each of the two or more sets of changes. Using the corresponding recovery process, the changes identified in each of the two or more sets of changes are undone in parallel.

27 Claims, 22 Drawing Sheets

| KEY 782 | APPLIED FLAG 784 |
|---------|------------------|
| ROW 9 | 1 |
| ROW 7 | 1 |
| ROW 22 | 0 |
| ROW 3 | 0 |
| ROW 14 | 1 |
| ROW 5 | 0 |
| ⋮ | ⋮ |

780

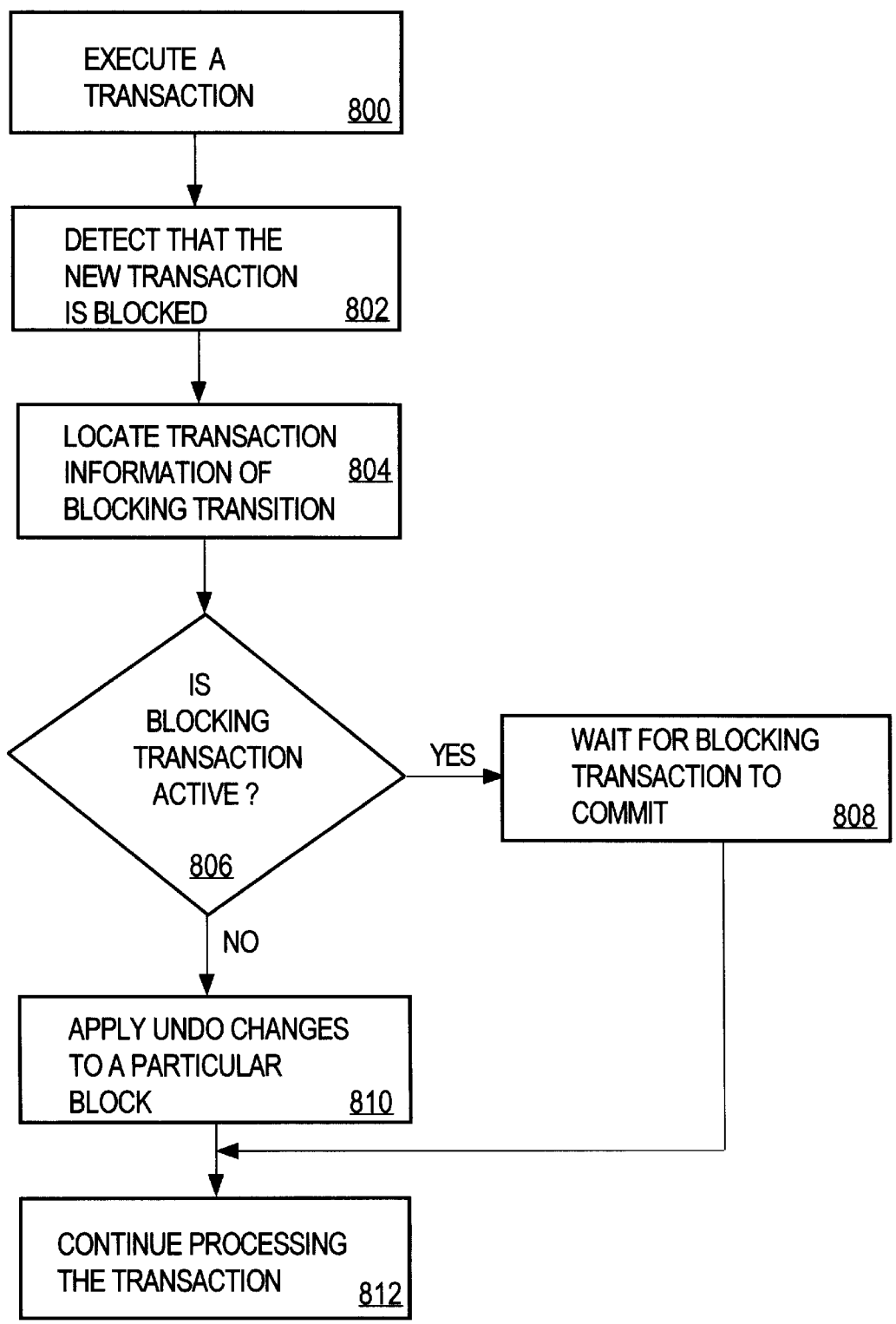

RECOVERING RESOURCES IN PARALLEL

FIELD OF THE INVENTION

The present invention relates to database management systems (DBMS). More specifically, the present invention relates to a method and apparatus for providing a parallel recovery mechanism for recovering dead transactions.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is atomic and comprised of one or more database language statements is referred to as a transaction. In a database sever, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database instance.

A buffer cache resides in a portion of the system memory and holds database information. Buffers in the buffer cache hold copies of data blocks that have been read from the data files residing on disk. The buffers are typically shared by all user processes that are concurrently connected to the instance. When a transaction desires to make a change to a data block, a copy of the data block is loaded into a buffer and the change is made to the copy of the data block stored in the database buffer cache in dynamic memory. Afterwards, the modified blocks of data are written from the database buffer cache back into the data files on disk.

The system memory also contains a redo log buffer. A redo log buffer is a circular buffer that holds information about update operations recently performed by transactions. This information is stored in redo entries. Redo entries contain the information necessary to reconstruct, or redo, changes made by operations such as INSERT, UPDATE, DELETE, CREATE, ALTER, or DROP, for example. Redo entries are generated for each change made to a copy of a data block stored in the database buffer cache. The redo log buffer is written to an active online redo log file group on disk by a background process. The records in the online redo log file group on disk are commonly referred to as redo logs.

An instance failure can occur when a problem arises that prevents an instance from continuing work. Instance failures may result from hardware problems such as a power outage, or software problems such as an operating system or database system crash. Instance failures can also occur expectedly, for example, when a SHUTDOWN ABORT or a STARTUP FORCE statement is issued.

Due to the way in which database updates are performed to data files in some database systems, at any given point in time, a data file may contain some data blocks that (1) have been tentatively modified by uncommitted transactions and/ or (2) do not yet reflect updates performed by committed transactions. Thus, an instance recovery operation must be performed after an instance failure to restore a database to the transaction consistent state it possessed just prior to the instance failure. In a transaction consistent state, a database reflects all the changes made by transactions which are committed and none of the changes made by transactions which are not committed.

A typical DBMS performs several steps during an instance recovery. First, the DBMS rolls forward, or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). After rolling forward, the data blocks contain all committed changes as well as any uncommitted changes that were recorded in the redo log prior to the crash.

Rollback segments include undo records for undoing uncommitted changes made during the roll-forward operation. These undo records contain data block change information. When a transaction updates a copy of a data block that has been read into a buffer, the update is stored as undo change information in an undo record. The updating of the copy of the data block and the storing of the undo change information is performed as an atomic unit of change such that either both events occur or none of the events occur. During database recovery, the information contained in the rollback segments is used to undo the changes made by transactions that were uncommitted at the time of the crash. The process of undoing changes made by the uncommitted transactions is referred to as "rolling back" the transactions.

FIG. 1 illustrates an example of rolling forward and rolling back after a crash. Database 110 is a database requiring recovery at time $t_1$. Database 120 represents the database after a redo log is applied at time $t_2$. The database 120 comprises both changes made by committed transactions 121 and changes made by uncommitted transactions 122. Database 130 represents the database at time $t_3$ after a rollback segment is applied. The database 130 comprises only changes made by committed transactions 121.

When rolling back a transaction, the DBMS releases any resources (locks) held by the transaction at the time of failure. Lastly, the DBMS resolves any pending distributed transactions that were undergoing a two-phase commit coordinated by the DBMS at the time of the instance failure.

Conventionally, to recover after a database instance crash, the DBMS invokes a single process to rollback any changes that were made by dead transactions. Once invoked, the single process performs the necessary recovery tasks. In general, using a single process to rollback all changes can help ensure proper consistency of the database once the changes have been applied.

A drawback associated with using a single process to recover after a database instance crash is that it can induce a bottleneck in the system as changes that were made by uncommitted transactions are forced to be rolled back serially. In certain cases, a large number of transactions may be active when an instance crashes, and therefore, a large number of uncommitted transactions may need to be rolled back. This large number of uncommitted transactions may include changes to portions of the database which are of immediate need. Thus, access to certain portions of the database may be delayed for a relatively long period of time, as serially rolling back a large number of uncommitted transactions can be very time consuming.

One disadvantage of the prior method of recovering after a crash of an instance of a database is that undo records for all uncommitted (dead) transactions must be applied before a user is allowed to execute a new transaction to access the database system. This can take a long period of time if there are a large number of undo records that need to be applied, even if many of the undo records contain undo change information that corresponds to resources that are not of interest to the new transaction.

One method that can be used to help reduce the period of time that a user must wait before executing a new transaction is by rolling back changes on an as needed transaction-by-transaction basis depending on the particular data blocks that are of interest to the new transaction. For example, if a new transaction requires access to a data block that is locked by a particular dead transaction, the recovery process can cause the particular dead transaction to be recovered first in order to make the data block available for the new transaction.

However, this method also suffers from inefficiencies if the recovery of the particular dead transaction requires undo changes to be applied to a large number of data blocks, but the new transaction only requires access to a small number of those data blocks. Thus, a user may be required to wait a large period of time for undo changes to be applied to data blocks that are not of interest to the new transaction.

Based on the foregoing, it is highly desirable to provide a mechanism for the number of undo changes that need to be applied when a new transaction encounters a resource that is locked by a dead transaction. In addition, it is also highly desirable to provide a mechanism for reducing the amount of time that is required to recover resources that are held by dead transactions.

SUMMARY OF THE INVENTION

The present invention provides a method for removing changes made by a particular transaction. To remove the changes, two or more sets of changes that were made by the particular transaction that can be removed in parallel are identified. Each of the two or more sets of changes are assigned a corresponding recovery process. Using the corresponding recovery process, the changes identified in each of the two or more sets of changes are undone in parallel.

According to one aspect of the invention, the two or more sets of changes are identified by determining dependencies between a plurality of changes that were made by the particular transaction.

According to another aspect of the invention, the two or more sets of changes are identified by identifying two or more sets of undo records that contain change information that can be applied to data blocks in parallel.

According to another aspect of the invention, to identify two or more sets of changes, a particular seed is assigned to each of a plurality of undo records that are associated with the particular transaction. The seeds are assigned based on which resource is associated with the change information that is contained in each of the plurality of undo records. Each of the plurality of undo records are then linked into a particular undo record hash chain based on the particular seed that is assigned to each of the plurality of undo records. A recovery process is assigned to each undo record hash chain such that changes in the undo records can be applied in parallel.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7B illustrates an array of block keys that can be used to identify the rows in a particular container for which undo changes reside in the undo record;

FIG. 8 is a flow diagram illustrating a method for performing a block level recovery after a transaction prematurely terminates;

DETAILED DESCRIPTION OF THE PREFERRED EMBODIMENT

A method and apparatus for recovering resources in parallel is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
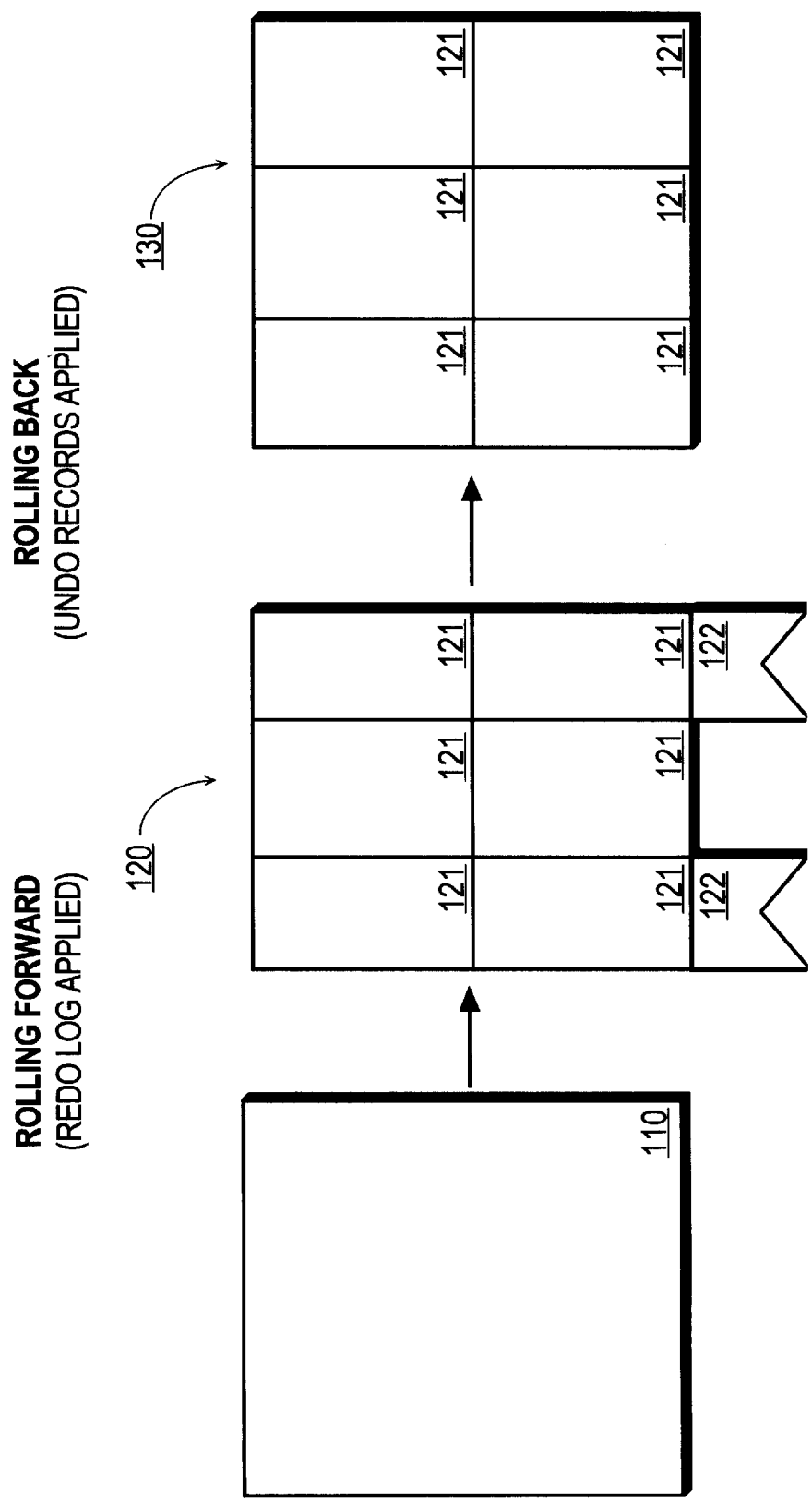
FIG. 1 illustrates rolling forward and rollback operations.
Figure 2:
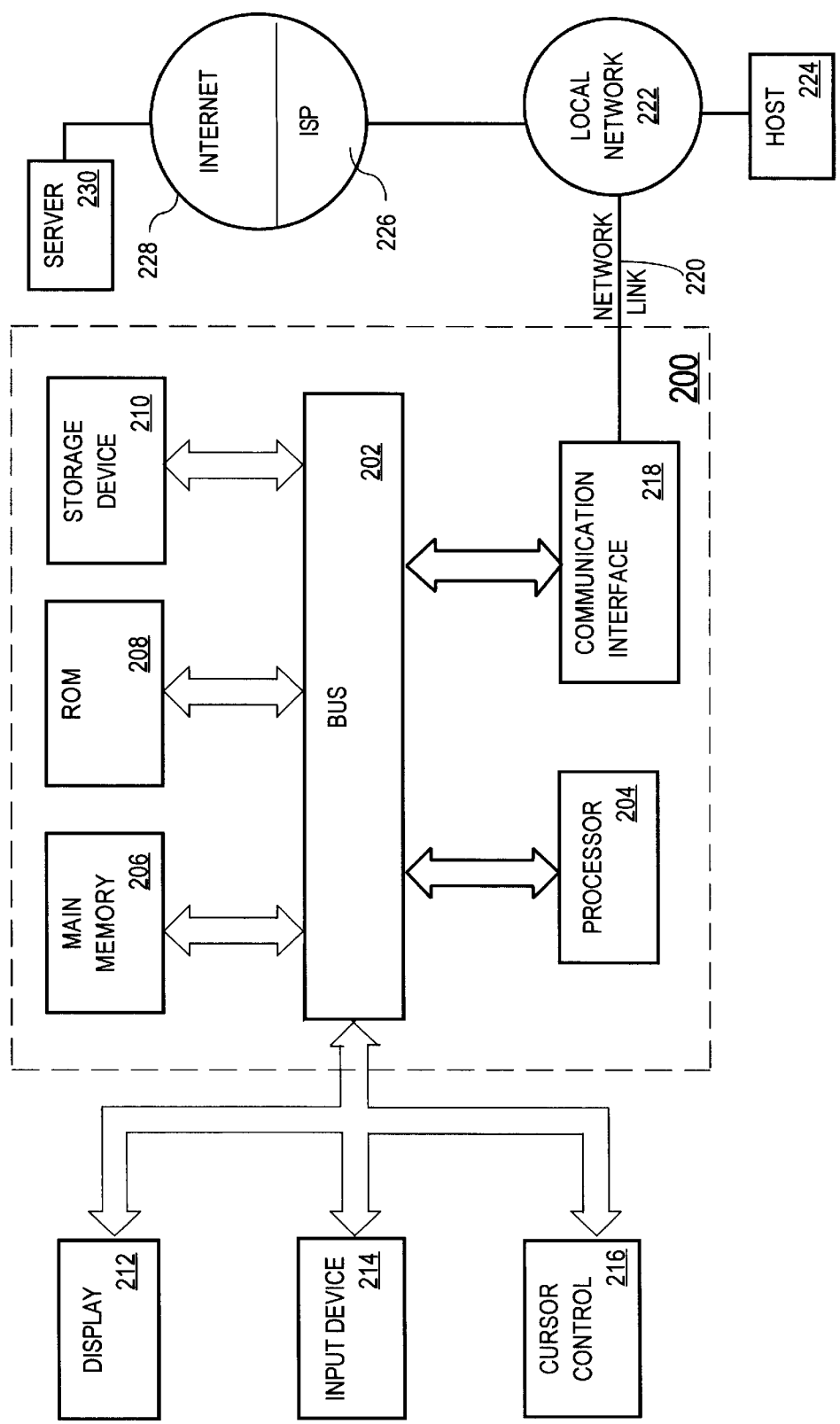
FIG. 2 is a block diagram of a system which may be programmed to implement the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for recovering resources in parallel. According to one embodiment of the invention, parallel recovery is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for recovering resources in parallel as described herein.

The received code may be executed by processor 204 as it is received, and/or stored in storage device 210, or other non-volatile storage for later execution. In this manner, computer system 200 may obtain application code in the form of a carrier wave.

Rollback Segments

A database system typically contains one or more rollback segments. Each rollback segment contains a transaction table and a plurality of undo records.

Figure 3A:
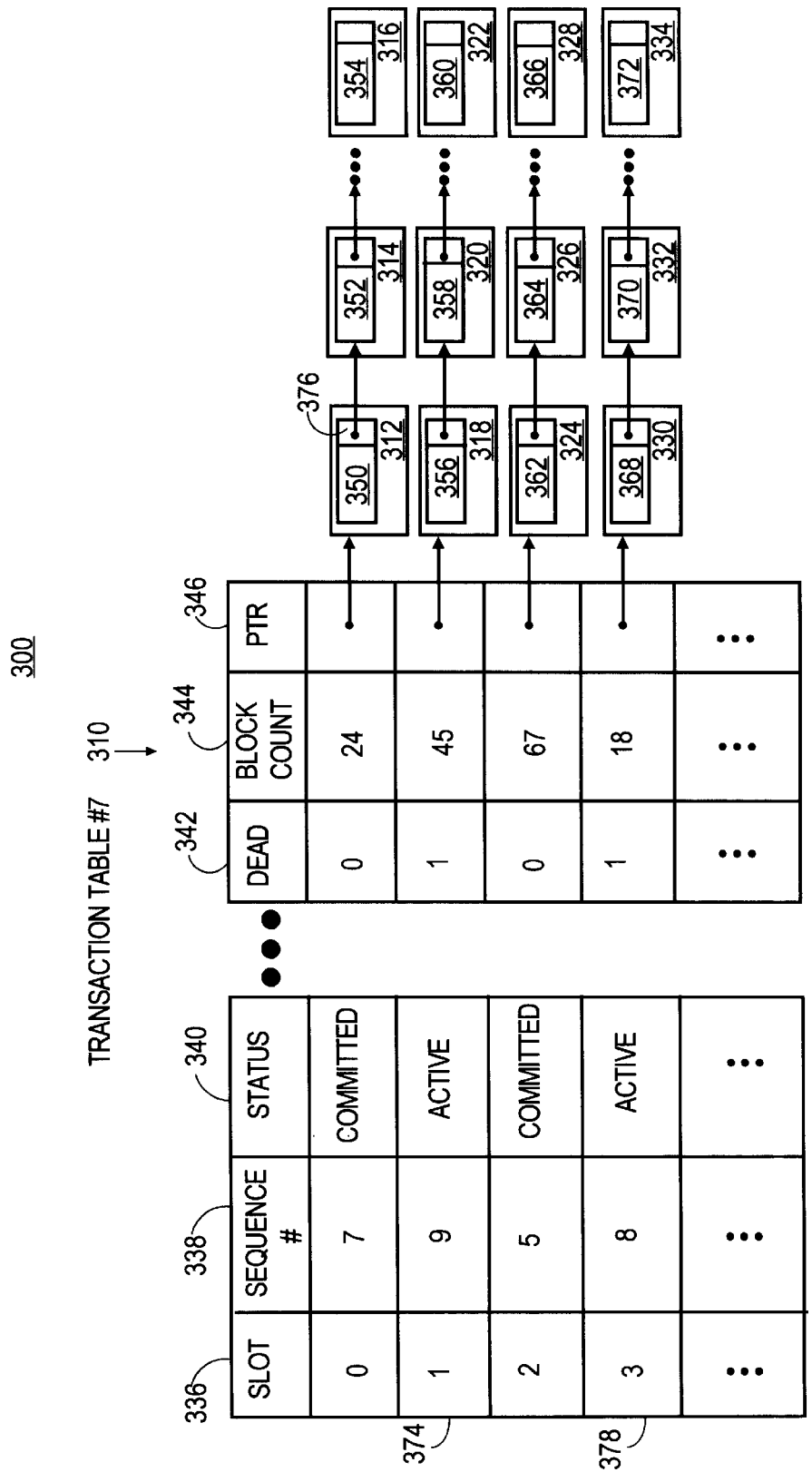
FIG. 3A illustrates an exemplary rollback segment according to an embodiment of the invention.

FIG. 3A illustrates an exemplary rollback segment 300 with a transaction table 310 and a plurality of undo blocks 312–334. As depicted, transaction table 310 includes a plurality of slots 336, where each slot can hold an entry that corresponds to a transaction. Each entry contains a sequence number 338, a status indication 340, a "DEAD" field 342 for indicating whether or not the corresponding transaction is dead, an block count 344, and a pointer 346 which points to the most recent undo record associated with the transaction.

The status flag 340 indicates whether the transaction that corresponds to the entry is active or has committed. The DEAD field 342 is used to identify whether a particular transaction is dead. The block count 344 is used to keep a running count of the number of undo blocks that are associated with a particular entry in the transaction table. Thus, when a transaction dies, the block count can be used to estimate the amount of work that will be required to recover the dead transaction.

Figure 3B:
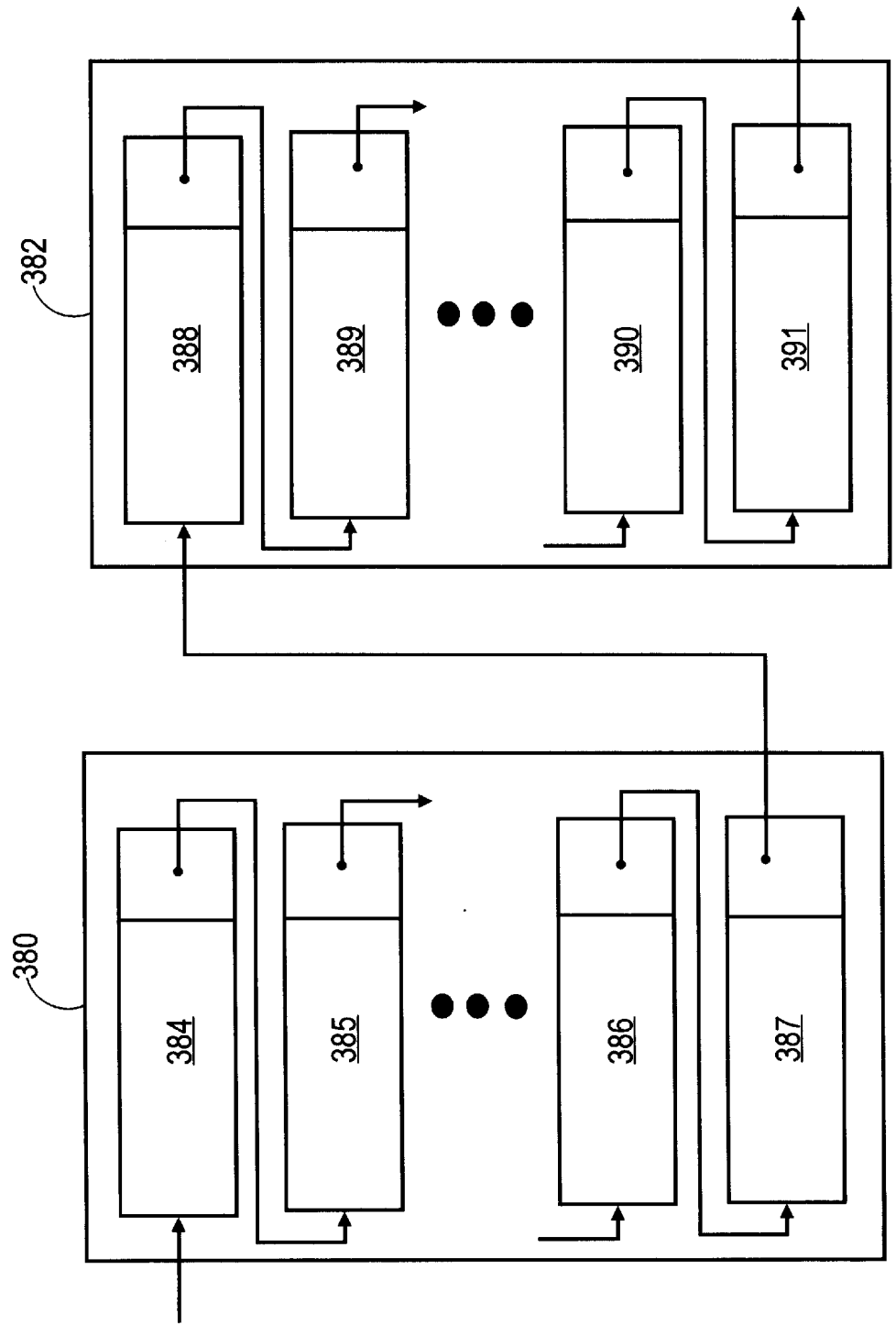
FIG. 3B depicts undo blocks containing a plurality of undo records in accordance with an embodiment of the invention.

For explanation purposes, the undo blocks 312–334 are depicted having only a single undo redo record. However, an undo block may contain a plurality of undo records. For example, FIG. 3B depicts two undo blocks 380 and 382 each respectively containing a plurality of undo records 384–387 and 388–391.

Referring back to FIG. 3A, the undo records 350–372 contain undo information that specifies how to remove the changes that were made to the database while performing an operation in a particular transaction. Undo records for the same transaction are linked together by pointers 376 to form an undo record chain for a particular transaction (transaction-based undo chain).

Undo records in a particular transaction-based undo chain are time ordered. The pointer 346 for a particular entry in the transaction table 310 points to the undo record (head) that contains the most recent change made by the corresponding transaction. In this example, undo records 350, 356, 362 and 368 contain the most recent change information while undo records 354, 360, 366 and 372 contain the least recent change information for the transactions which correspond to the entries in transaction table 310.

The number of entries that a particular transaction table can hold is limited. When a transaction table is full and an entry needs to be added for a new transaction, the entry that corresponds to the oldest transaction is overwritten with the new entry. To distinguish between transactions that have used the same slot, the sequence number 338 for a slot is changed every time the slot is reused. For example, every time a slot is reused, the sequence number may be incremented.

To uniquely identify transactions, transaction IDs are generated from the information contained in the transaction table entries that correspond to the transaction. In one embodiment, the transaction ID of a transaction consists of the number of the transaction table that contains the entry for the transaction, the slot number that holds the entry, and the sequence number of the transaction.

Data Containers

Figure 4:
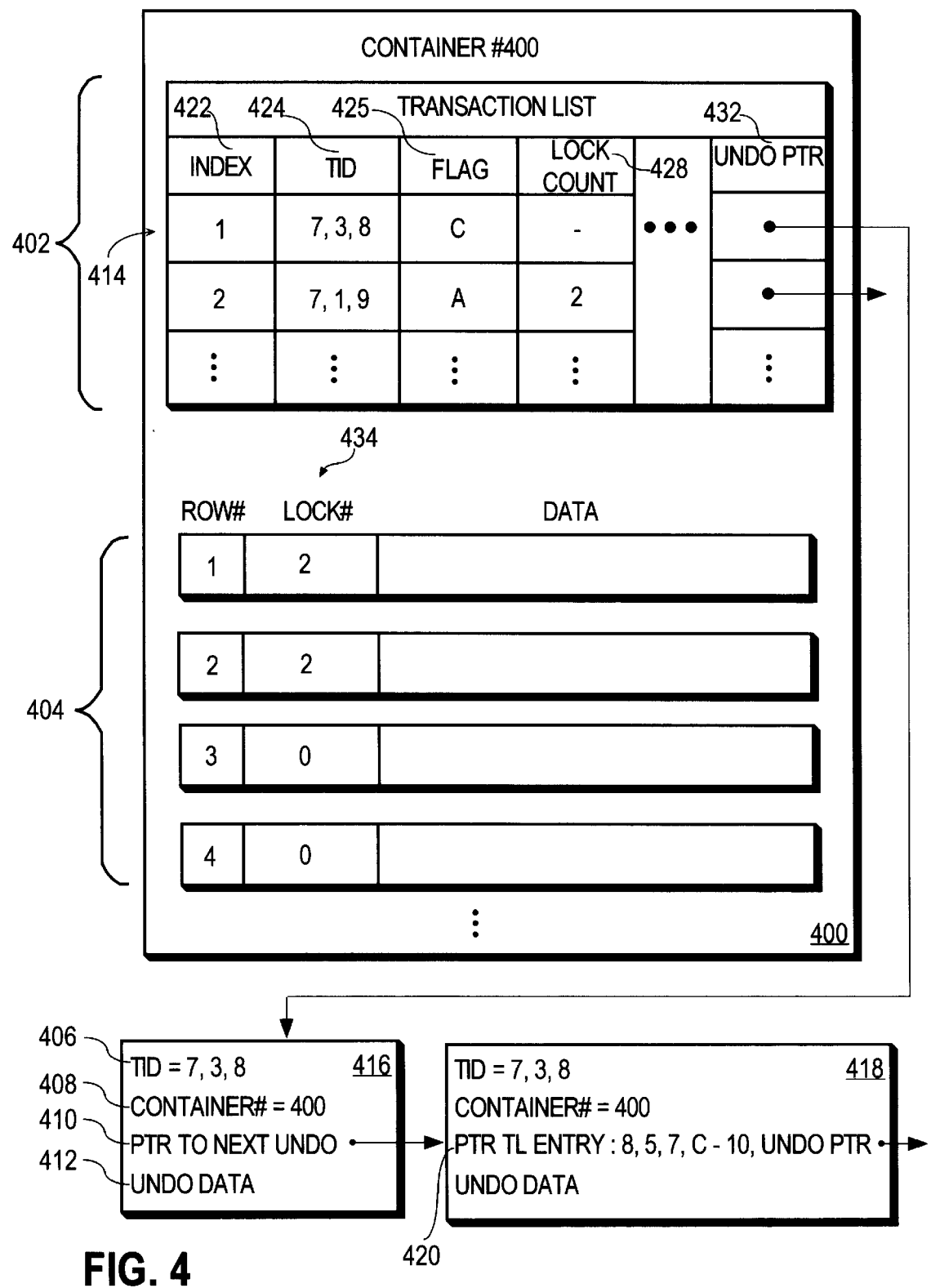
FIG. 4 illustrates a data container and rollback records of a database according to an embodiment of the invention.

When data in the database is changed in response to the execution of a transaction, the transaction ID of the transaction is stored with the data to identify the transaction that made the changes. Referring to FIG. 4, it illustrates an exemplary data container 400 (i.e. data block) of a database. The data container 400 includes a transaction list section 402 and a data section 404. The transaction list section 402 includes entries that correspond to transactions that have modified data container 400. Each entry includes an index number 422, a transaction ID 424, a status flag 425, a lock count indicator 428, and an undo pointer 432. The terms "data container" and "data block" are used interchangeably throughout the document.

The status flag 425 indicates whether the transaction that corresponds to the entry is active or has committed. The lock count indicator 428 indicates how many rows within the block are write locked by the transaction. The undo pointer 432 points to a rollback entry in the rollback segment that indicates how to undo the most recent change made to the block by the transaction that corresponds to the entry.

The data section of the block includes rows of data. A portion of each row is used as a write lock indicator 434 to indicate whether the row is currently write locked. In the preferred embodiment, the write lock indicator 434 contains a number that indicates the entry in the transaction list belonging to the transaction that holds the lock on the row in question.

Rollback Entries

FIG. 4 also illustrates the contents of a rollback entry in a rollback segment and how the rollback entry is accessed by an undo pointer according to an embodiment of the invention. The rollback entry includes a transaction ID 406, a block number 408, a prior change pointer 410, and undo information 412. The transaction ID 406 identifies the transaction which performed the operation that corresponds to the undo record. The block number 408 indicates the data container on which the operation was performed. The undo information 412 contains data necessary for undoing the operation that was performed on the identified block by the identified transaction.

The undo pointer 410 points to a rollback entry 418 for undoing a previous change to the same block by the same transaction. Each change made to the block by a transaction is linked in this manner to form a linked list of rollback entries. Linked lists that link together changes made to a particular block are referred to herein as "block-based undo chains". The undo pointer in the transaction list section 402 points to the end of the block-based undo chain that represents the most recent change to the block made by the transaction. At the other end of the block-based undo chain is the undo record that corresponds to the first change made to the block by the transaction.

The rollback entry that corresponds to the first change made to the block by a particular transaction does not contain a pointer to an undo record for an earlier change to the block by the same transaction, since there can be no change earlier than the first change. Rather, the rollback entry that corresponds to the first change made by a transaction to a block contains the entry that was overwritten in the transaction list of the block by the entry for the transaction at issue.

In the illustrated example, the entry 414 corresponds to the transaction identified by the transaction ID "7,3,8". The undo pointer in entry 414 points to the rollback entry 416 that corresponds to the last change made to data container 400 by transaction "7,3,8". The undo pointer of rollback entry 416 points to rollback entry 418 that corresponds to the first change made to data container 400 by transaction "7,3,8". Thus, transaction "738" made two updates to the data in data container 400. The undo record 418 contains a record 420 of the entry that was overwritten by entry 414.

Although the example depicts rollback entry 416 as having a physical pointer (undo pointer 410) that points to rollback entry 418, in certain embodiments, rollback entries do not actually contain a physical pointer to the undo record that contains the next most recent change information for the data container. Instead, the each rollback entry contains a record of the entry that was overwritten in the transaction list of the data container by the entry for the transaction at issue. Therefore, by applying the undo information in an undo record, the corresponding undo pointer in the transaction list to pointer is automatically updated to point to the undo record having the next most recent change information. For example, by including information that indicates that the entry for rollback entry 418 was overwritten in the transaction list of the data container 400 by the entry for rollback entry 416, by applying the change information in rollback entry 416 the undo pointer 432 for entry 414 is automatically updated to point to rollback entry 418.

Recovery After an Instance Failure

Figure 5:
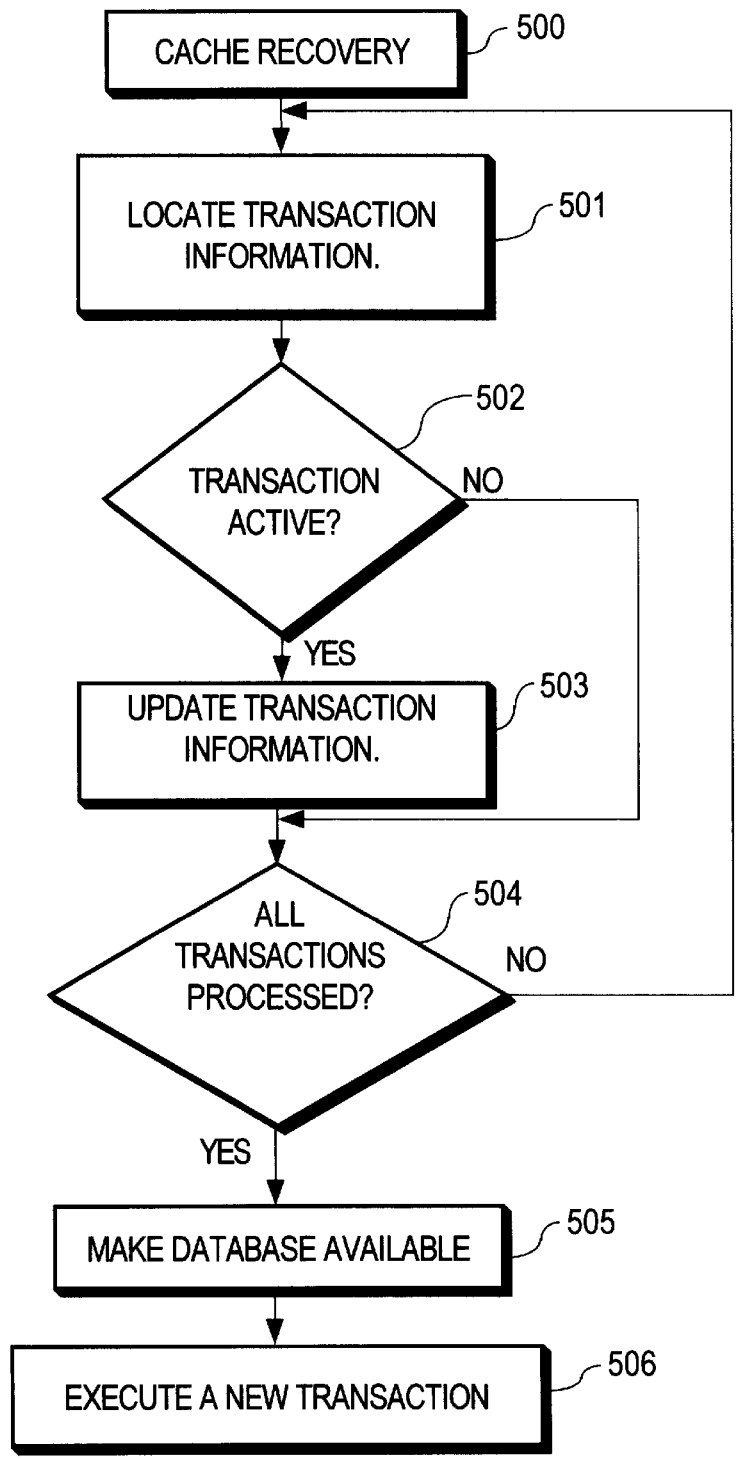
FIG. 5 is a flow diagram illustrating a method for recovering after an instance failure in a database.

FIG. 5 is a flow diagram illustrating a method for recovering after an instance failure in a database. At step 500, cache recovery is performed. Cache recovery involves updating the database to reflect changes that had been made to cached blocks of data prior to the crash, but which had not yet been applied to the database at the time of the crash. As mentioned earlier, cache recovery typically involves applying a plurality of changes recorded in a redo log to data files in the database.

At step 501, transaction information that corresponds to a transaction associated with an instance that crashed is found. In one embodiment of the present invention, the transaction information is in the form of a transaction table such as the table illustrated in FIG. 3. The transaction table includes entries corresponding to transactions that existed in an instance. Finding transaction information corresponding to a transaction associated with an instance that crashed can be achieved by identifying a rollback segment associated with the instance that crashed. Once a rollback segment associated with the instance that crashed is identified, a transaction table in the rollback segment may be accessed.

At step 502, it is determined based on the transaction information whether the transaction associated with the instance that crashed was active. This determination can be achieved by reading status information in the transaction table. The status information will indicate whether the transaction was committed or active at the time of the instance failure. If the transaction was active when the instance crashed, then control proceeds to step 503. If the transaction was committed when the instance crashed, then control proceeds to step 504.

At step 503, the transaction information is updated to indicate that the transaction is dead. This can be achieved by setting a flag in a field of an entry that is associated with the transaction in the transaction table. For example, a bit may be set in the "DEAD" field of the transaction table entry that corresponds to the transaction (see FIG. 3).

At step 504, it is determined whether all the transactions are processed. If all the transactions are processed, control proceeds to step 505. If not all the transactions are processed, control returns to step 501.

At step 505, the database is made available to the users. By making the database available to the users after updating the transaction information and before undoing any updates performed by the dead transaction, the present method for recovery allows the user to access data that was not affected by the instance crash almost immediately after the crash. Thus, the users are not penalized by having to wait for the DBMS to recover data files which the users would otherwise not need to access.

At step 506, new transactions begin to execute.

Recovery After a Transaction Failure

Figure 6:
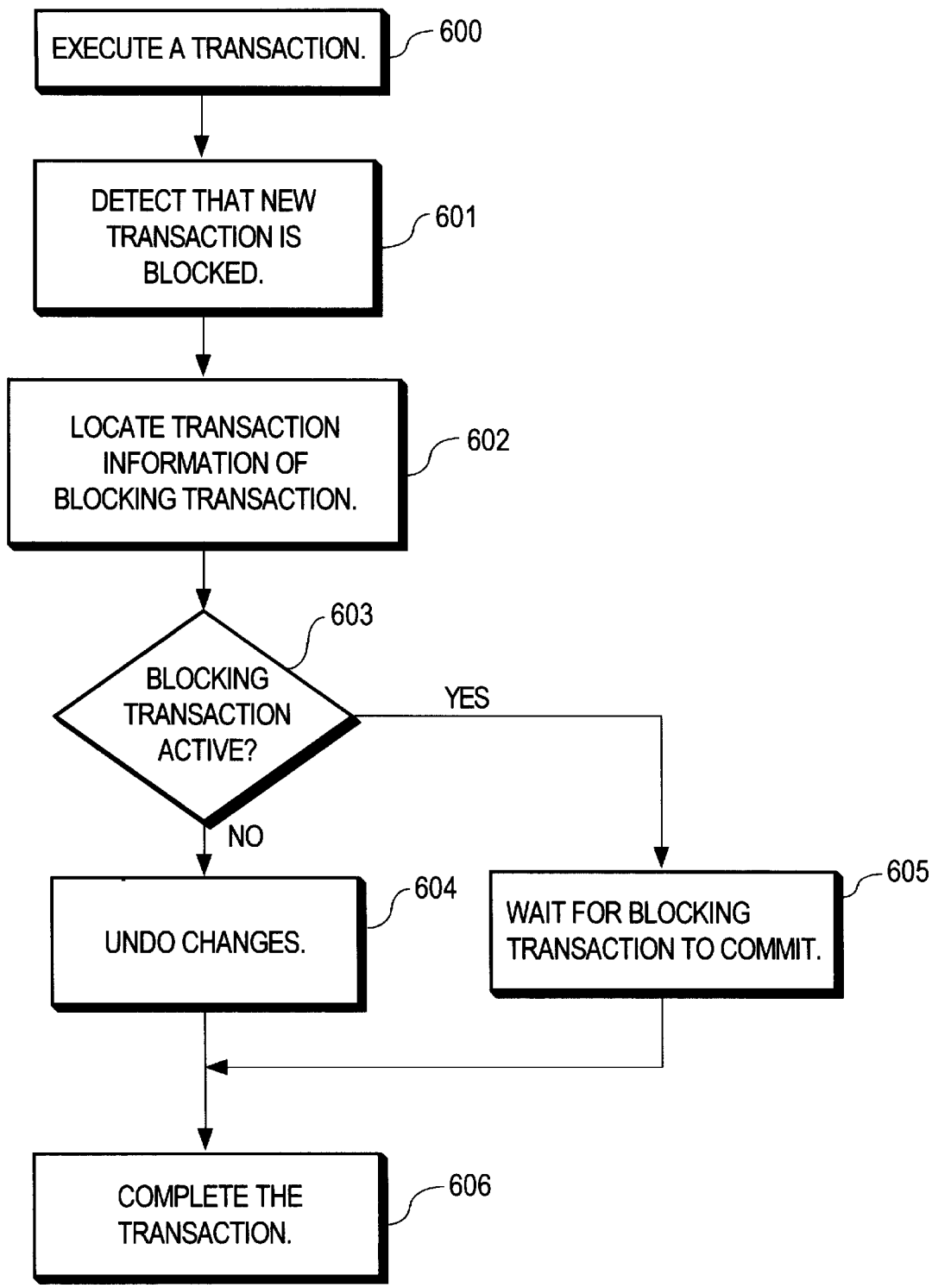
FIG. 6 is a flow diagram illustrating a method for recovering after a transaction failure in a database.

FIG. 6 is a flow diagram illustrating a method for recovering after a transaction prematurely terminates. These steps may be performed when a new transaction attempts to access a resource that is held by another transaction. At step 600, a new transaction is executed.

At step 601, the system detects that a new transaction is blocked. The detection is achieved when the new transaction attempts to access a resource held by another transaction.

At step 602, transaction information that corresponds to the blocking transaction is found. In one embodiment of the present invention, the transaction information is in the form of an entry in a transaction table such as the table 310 illustrated in FIG. 3. As explained above, the transaction table 310 includes entries, each of which corresponds to and reflects the current state of a transaction in an instance.

At step 603, it is determined, based on the transaction information, whether the blocking transaction is an active transaction or a dead transaction. This determination can be achieved by reading status information in the transaction table and gaining access to a memory structure indicating whether the transaction is still alive. The status information will indicate whether the transaction is active or committed. According to one embodiment, a dead status is indicated by an active status flag in a transaction table of an instance that crashed. If the transaction is dead, then control proceeds to step 604. If the transaction is not dead, then control proceeds to step 605.

At step 604, the new transaction undoes some or all of the changes made by the blocking transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released. In certain embodiments, a block level recovery mechanism is used to apply only those undo records of a dead transaction that correspond to the particular block of interest. The block level recovery mechanism will be described in greater detail below.

At step 605, the system waits for the blocking transaction to commit.

At step 606, the new transaction accesses the resource and completes the transaction.

Block Level Recovery Overview

A drawback with undoing changes at the transaction level is that when a new transaction encounters a resource (e.g. data block or a row in a data block) that is currently held by a dead transaction, the new transaction may be required to wait for undo changes to be applied which correspond to resources (data blocks) that are not of interest to the new transaction. However, by connecting the undo records in block-based undo chains, when a new transaction encounters a resource (e.g. a rowlock on a row in a particular data block) that is currently held by a dead transaction, a block level recovery mechanism can be used to apply only those undo records of a dead transaction that correspond to the particular resource (data block) of interest. By using the block level recovery mechanism, a particular resource (data block) can be recovered and made available for use without having to apply undo records that correspond to changes in resources (data blocks) that are not of interest to the new transaction.

Figure 7A:
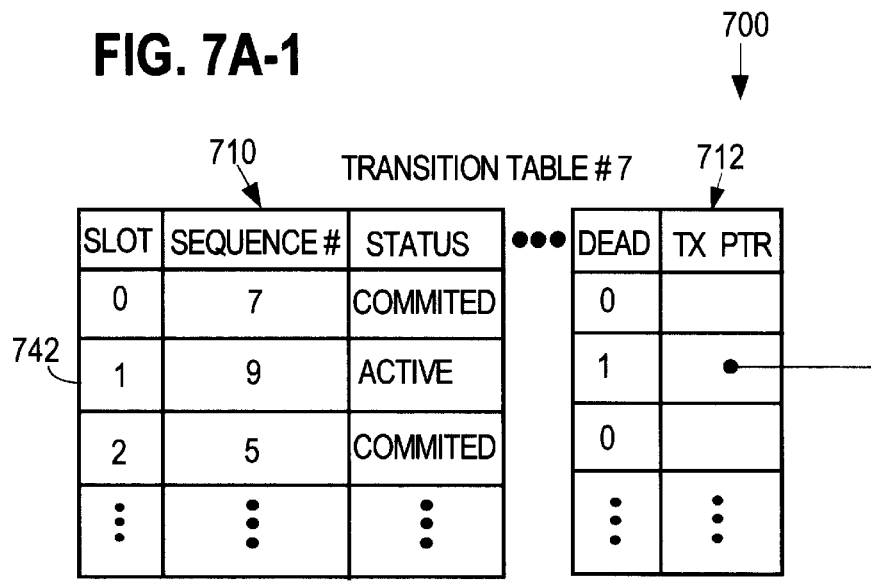
FIG. 7A illustrates an example of a system for performing block level recovery in accordance with an embodiment of the invention.
Figure 1:
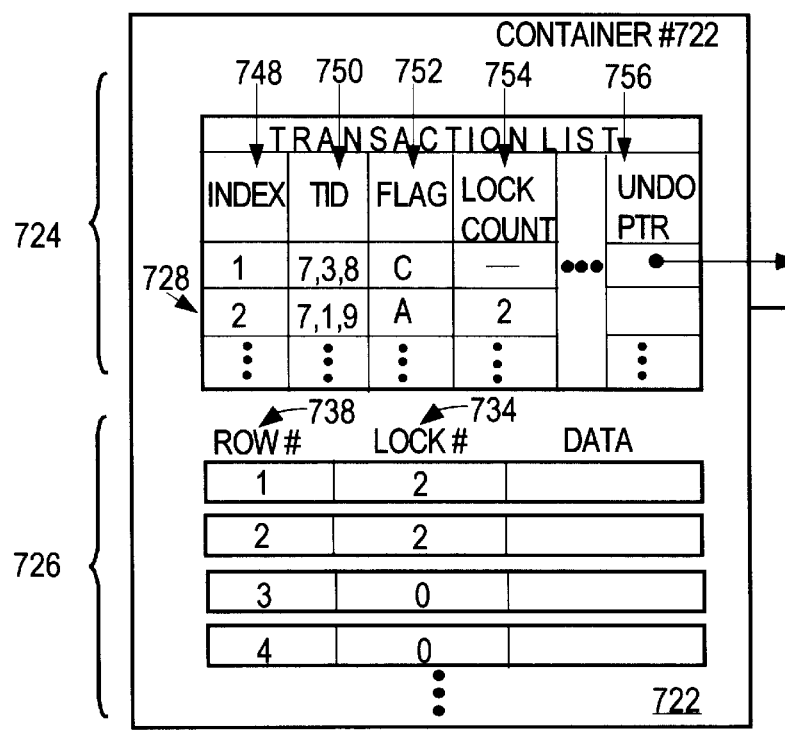
Figures 2, 7A:
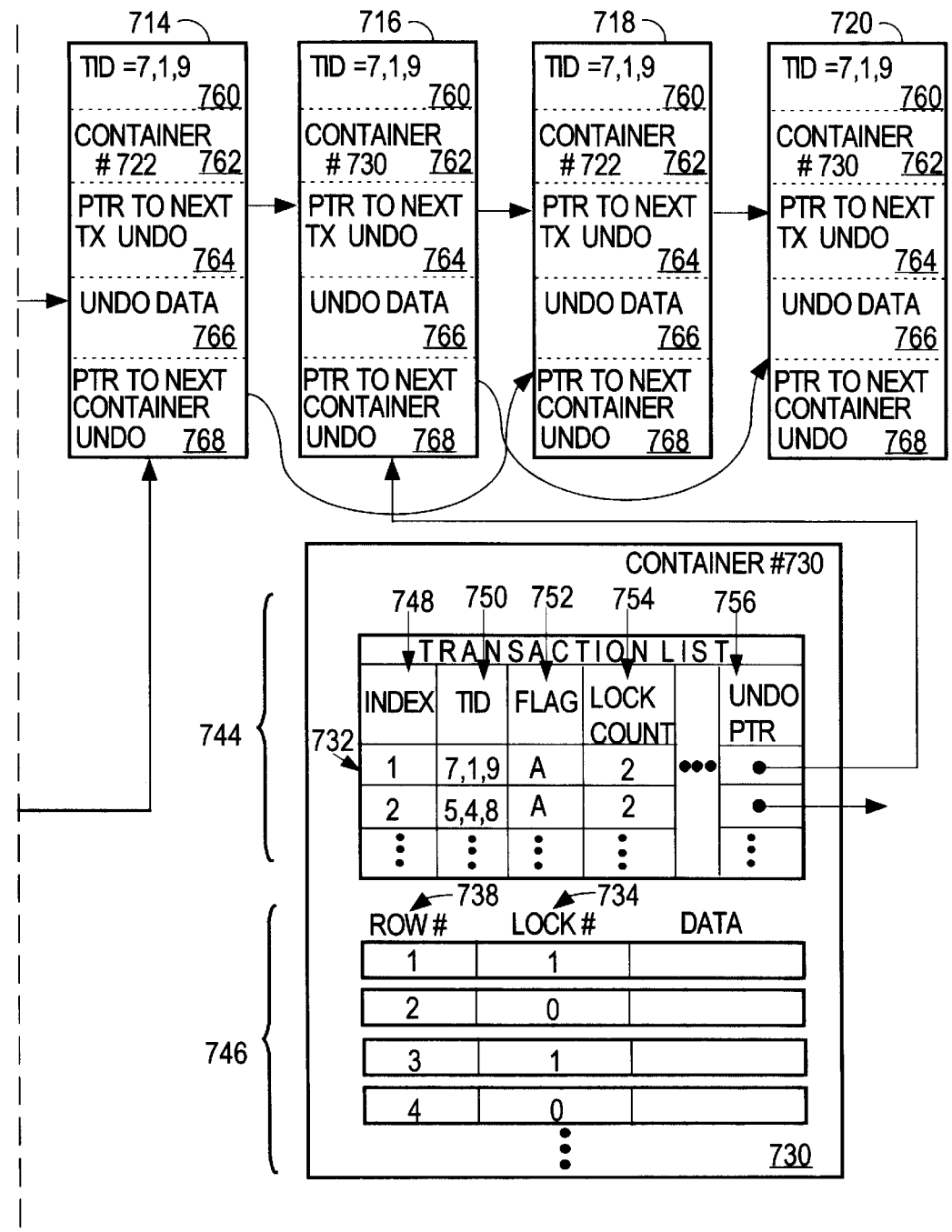

FIG. 7A illustrates an example of a system 700 for performing block level recovery in accordance with an embodiment of the invention. As depicted, system 700 contains a transaction table 710, data containers 722 and 730, and a plurality of undo blocks 714, 716, 718 and 720.

In this example, each undo block contains a single undo record. Also as depicted in this example, each undo record contains undo changes that reflect changes made to a single data container. However, an undo block may contain multiple undo records. In addition, different undo records within a single undo block may reflect changes made to different data containers.

Typically, the undo changes within a given undo record will reflect changes that were made to a single data container. However, as will be described in greater detail hereafter, the changes that are initially made to a single data container may later migrate to multiple data containers due to the split of data containers. Consequently, at the time the changes need to be undone, the changes contained in a particular undo record may contain changes that, at the time of recovery, correspond to more than one data container.

Transaction table 710 includes a plurality of transaction-based undo chain pointers 712 (TX PTR) that are each associated with a particular transaction entry in transaction table 710. Each transaction-based undo chain pointer 712 points to the head of a chain of undo records that correspond to changes made by the transaction associated with the pointer. In this example, the TX PTR for entry 742 points to a transaction-based undo chain for transaction "7,1,9". The chain begins with the undo block 714 that contains the undo record for the last change made by transaction "7,1,9". The chain ends with the undo block 720 that contains the undo record for the first change made by transaction "7,1,9".

Data containers 722 and 730 respectively include transaction list sections 724 and 744 and data sections 726 and 746. Transaction list section 724 includes entries that identify transactions that have modified data container 722 and transaction list section 744 includes entries that identify transactions that have modified data container 730. The transaction list sections (724 and 744) contain an entry for each transaction that is actively updating the corresponding data container.

Each entry includes an index number 748, a transaction ID 750, a status flag 752, a lock count indicator 754, and an undo pointer 756. When an active transaction obtains a write lock on a row, a persistent rowlock is maintained on the row until the transaction either commits or is rolled back.

The undo pointer 756 for each entry points to head of a block-based undo chain. At the head of the block-based undo chain is an undo record that indicates how to undo the most recent change made to the container by the corresponding transaction. Although a transaction list section may contain entries for multiple transactions that are concurrently updating the corresponding container, no two entries in a particular transaction list section can simultaneously contain rowlocks for the same row. Thus, no two transactions can make changes to the same row of the same container at the same time.

The data section of each container includes rows of data that are identified by row numbers 738. A portion of each row is used as a write lock indicator 734 to indicate whether a particular row is currently write locked. In the preferred embodiment, the write lock indicator 734 contains a number that indicates the particular entry in the transaction list belonging to the transaction that holds the lock on the row in question. For example, row 1 of data container 730 is currently locked by transaction list entry 732.

The undo records in undo blocks 714, 716, 718 and 720 include a transaction ID 760, a container number 762, a next tx undo pointer 764, undo information 766 and a pointer to next container undo 768. The transaction ID 760 identifies the transaction which performed the operation that corresponds to the undo record. The container number 762 identifies the container on which the operation was performed.

In certain embodiments, the value of the container number 762 in an undo record is set equal to the address of the data container for which the changes in the undo record correspond at the time the undo record is generated. In one embodiment, the container number provides an index to an array of block keys that identify a list of containers for which undo changes reside in the undo record. The block keys identify a particular row in a particular container for which undo changes reside in the undo record. For example, FIG. 7B illustrates an array of block keys 780 that can be used to identify the rows in a particular container for which undo changes reside in the undo record. In this example, the array of block keys 780 contains a key entry 782 for each row for which an undo change resides in the undo record. Associated with each key entry 782 is an applied bit 784 which are used to indicate whether the changes for a particular row have previously been applied.

The undo information 766 contains data necessary for undoing the changes that were performed on the identified container by the identified transaction.

The next tx undo pointer 764 points to the undo block that contains the next undo record in the transaction-based undo chain. The next undo block in the transaction-based undo chain is the undo block that contains the undo record for undoing the previous change that was made by the same transaction. As depicted, each undo block that contains changes made by the same transaction is linked in this manner to form the transaction-based undo chain.

In this example, the transaction-based undo chain pointer associated with entry 742 in the transaction table 710, is used to connect to the head of the transaction-based undo chain (the undo record in undo block 714) which represents the most recent changes made by transaction "7, 1, 9". At the other end of the transaction-based undo chain is the undo block 720 that contains the undo record that corresponds to the first change made by transaction "7, 1, 9". Because the undo record in undo block 720 corresponds to the first change made by transaction "7, 1, 9", its next tx undo pointer 764 does not connect to another undo record.

The pointer to next container undo 768 points to the undo record that contains undo changes for undoing a previous change, if any, made to the same container by the same transaction. Each change made to the container by a particular transaction is linked in this manner to form the block-based undo chain of undo records.

The undo pointer 756 in each entry of transaction list sections 724 and 744 point to the undo record that represents the most recent change to the container that was made by the entry's corresponding transaction. In this example, the undo pointer for entry 728 of container 722 points to the undo record in undo block 714 which contains the most recent change that was made to the block (container 722) by the identified transaction (i.e. 7,1,9). Also illustrated in this example, the undo pointer for entry 732 of container 730 points to the undo record in undo block 716 which contains the most recent change that was made to the block (container 730) by the identified transaction (i.e. 7,1,9). The undo record thus identified constitutes the head of a block-based undo chain.

At the other end of each block-based undo chain is the undo record that corresponds to the first change that was made to the container by the corresponding transaction. The undo record that corresponds to the first change made to a container by a particular transaction does not contain a pointer to an undo record for an earlier change to the container by the same transaction, since there can be no change earlier than the first change. Rather, the undo record that corresponds to the first change made by a transaction to a container contains undo information that is used to reconstruct the entry that was overwritten in the transaction list by the entry for the transaction at issue.

In the illustrated example, the entries 728 and 732 correspond to the transaction identified by the transaction ID "7,1,9". The undo pointer in entry 728 points to the undo record in undo block 714 which contains the last change made to data container 722 by transaction "7,1,9". The undo pointer in entry 732 points to the undo record in undo block 716 which contains the last change made to data container 730 by transaction "7,1,9". The pointer to next container undo 768 of the undo record in undo block 714 points to the undo record in undo block 718 which corresponds to the first change made to data container 722 by transaction "7,1,9". The pointer to next container undo 768 of the undo record in undo block 716 points to the undo record in undo block 720 which corresponds to the first change made to data container 730 by transaction "7,1,9". Thus, in this example, transaction "719" performed two separate updates (i.e. atomic changes) to the data in data container 722 and 730.

Performing Block Level Recovery

FIG. 8 is a flow diagram illustrating a method for performing a block level recovery after a transaction prematurely terminates. These steps may be performed when a new transaction attempts to access a resource that is held by another transaction. In this example, it shall be assumed that the new transaction has attempted to access information contained in row 1 of container 730.

At step 800, a new transaction is executed. At step 802, the system detects that the new transaction is blocked. In this example, the detection is achieved when the new transaction attempts to access information contained in container 730 which is held by another transaction.

At step 804, transaction information that corresponds to the blocking transaction is found. In one embodiment of the present invention, the transaction information is in the form of an entry in a transaction table such as entry 742 in transaction table 710. As explained above, the transaction table 710 includes entries, each of which corresponds to and reflects the current state of a transaction in an instance.

At step 806, it is determined, based on the transaction information, whether the blocking transaction is an active transaction or a dead transaction. This can be determined by reading status information in the transaction table and gaining access to a memory structure indicating that the transaction is still alive. The status information will indicate whether the transaction is active or committed. In certain embodiments, the dead field in the transaction table entry is checked to determine if the transaction is still alive. In an alternative embodiment, a dead status is indicated by an active status flag in a transaction table of an instance that is known to have crashed. If the transaction is dead, then control proceeds to step 810.

If the transaction is active, at step 808, the system waits for the blocking transaction to release the lock. Control then proceeds to step 812.

At step 810, the new transaction undoes the changes to the particular container that is held by the blocking transaction. To undo the changes, the new transaction retrieves the undo records that contain changes to the particular container that is held by the dead transaction. After the undo records are retrieved, the operations specified in the undo records are executed and the lock on the container is released. Each undo record contains a vector of an applied flags that is used to indicate whether the undo changes in an undo record have been applied to the corresponding container. When changes contained in an undo record are applied to the appropriate container, the corresponding applied flags are updated to indicate that the changes have been applied.

One advantage of maintaining a vector of applied flags for each undo record is that it enables other recovery processes to know that a particular undo record has already been applied so that they will not reapply the undo record. This is particularly important, for example, when recovery is being performed concurrently on a block-level basis and some other basis. For example, a background process may be performing undo on a transaction level basis. During transaction-based recovery, a dead transaction is identified and undo records in the transaction-based undo chain for the dead transaction are applied in order. During the transaction-based recovery, undo records that have previously been applied by block-level recovery (as indicated by the applied flag) are skipped. During block-level recovery, undo records that have previously been applied during transaction-based recovery are skipped.

In this example, the undo pointer associated with entry 732 of container 730 is used to locate the undo record in undo block 716 which contains the most recent change to container 730 by the blocking transaction. The operations specified in the undo record of undo block 716 are then applied to container 730. After the specified undo operations are applied, the applied flags associated with the undo record in undo block 716 are set to indicate that the undo record has been applied.

The undo pointer associated with entry 732 is then updated using the pointer to next container undo 768 of undo record in undo block 716 to point to the undo record that contains the next most recent change to container 730. The undo pointer associated with entry 732 is automatically updated by applying the changes in the undo record in undo block 716. In this example, the undo pointer associated with entry 732 is updated to point to the undo record in undo block 720.

Each undo record in the block-based undo chain is applied in the same fashion. Thus, after applying the undo record in undo block 716, the next undo record in the block-based undo chain is processed. In the present example, the next undo record in the block-based undo chain is the undo record in undo block 720. Therefore, the operations contained in the undo record of undo block 720 are applied to container 730. Because the undo record in undo block 720 is the last undo record in the block-based undo chain, applying the undo record causes the lock held on container 730 by the dead transaction 742 to be released. It should be noted that because of possible row migration, a particular record may contain changes for two separate containers. Thus, in applying the changes to a particular container, only those applied flags that are associated with the particular container in which the changes are applied are updated to reflect that the changes have been applied.

At step 812, the new transaction accesses the container and continues processing the transaction.

Row Level Recovery Overview

In certain embodiments, a row level recovery mechanism is used to perform recovery on a row level basis. Using the row level recovery mechanism, when a new transaction encounters a lock on data contained in a particular resource (e.g. row of a container), the new transaction causes only those changes in the undo records that correspond to the particular resource (row of the container) to be applied. Thus, using the row level recovery mechanism, a particular resource (row of data in a data container) can be recovered without first having to apply undo changes that correspond to resources (rows) that are not of interest to the new transaction. Recovering at the row level can be achieved since only one transaction can obtain a write lock on a particular row in a particular container at any one time.

Figure 9:
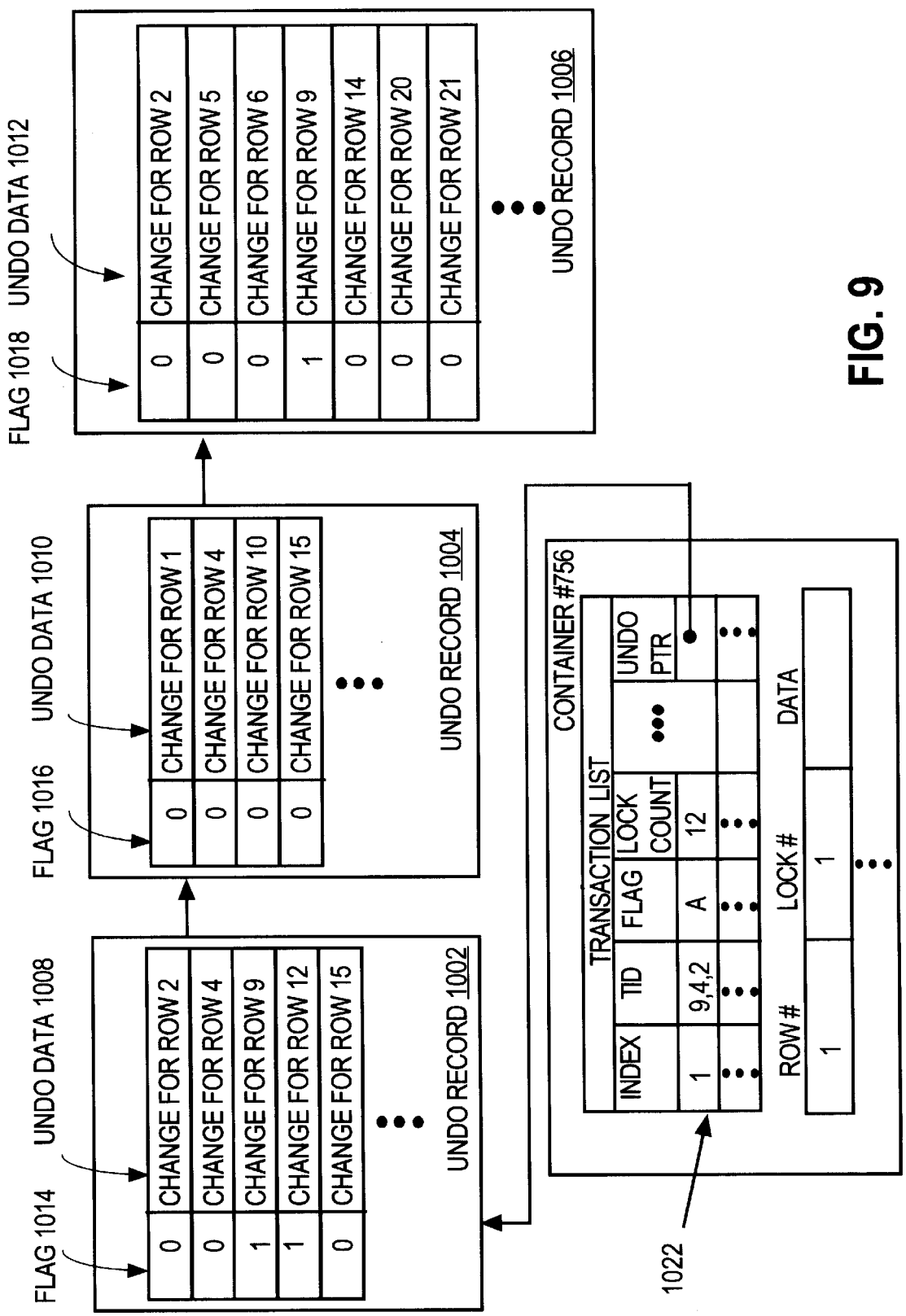
FIG. 9 illustrates a system in which a partial undo record recovery can be performed according to an embodiment of the invention.

FIG. 9 illustrates three undo records 1002, 1004 and 1006 associated with a "container 756" in which row level recovery can be performed according to an embodiment of the invention. For explanation purposes, only the undo data 1008, 1010 and 1012 and flags 1014, 1016 and 1018 are depicted in undo records 1002, 1004 and 1006. As illustrated, undo data 1008, 1010 and 1012 contain undo changes for different rows in "container 756". Although the changes contained in an undo record represent changes that were performed as an atomic unit of work, in certain embodiments, the changes for a particular row can be applied independent of one another. For example, the change for row 9 in undo data 1008 can be applied without applying the change to row 4 of undo data 1008.

Figure 10:
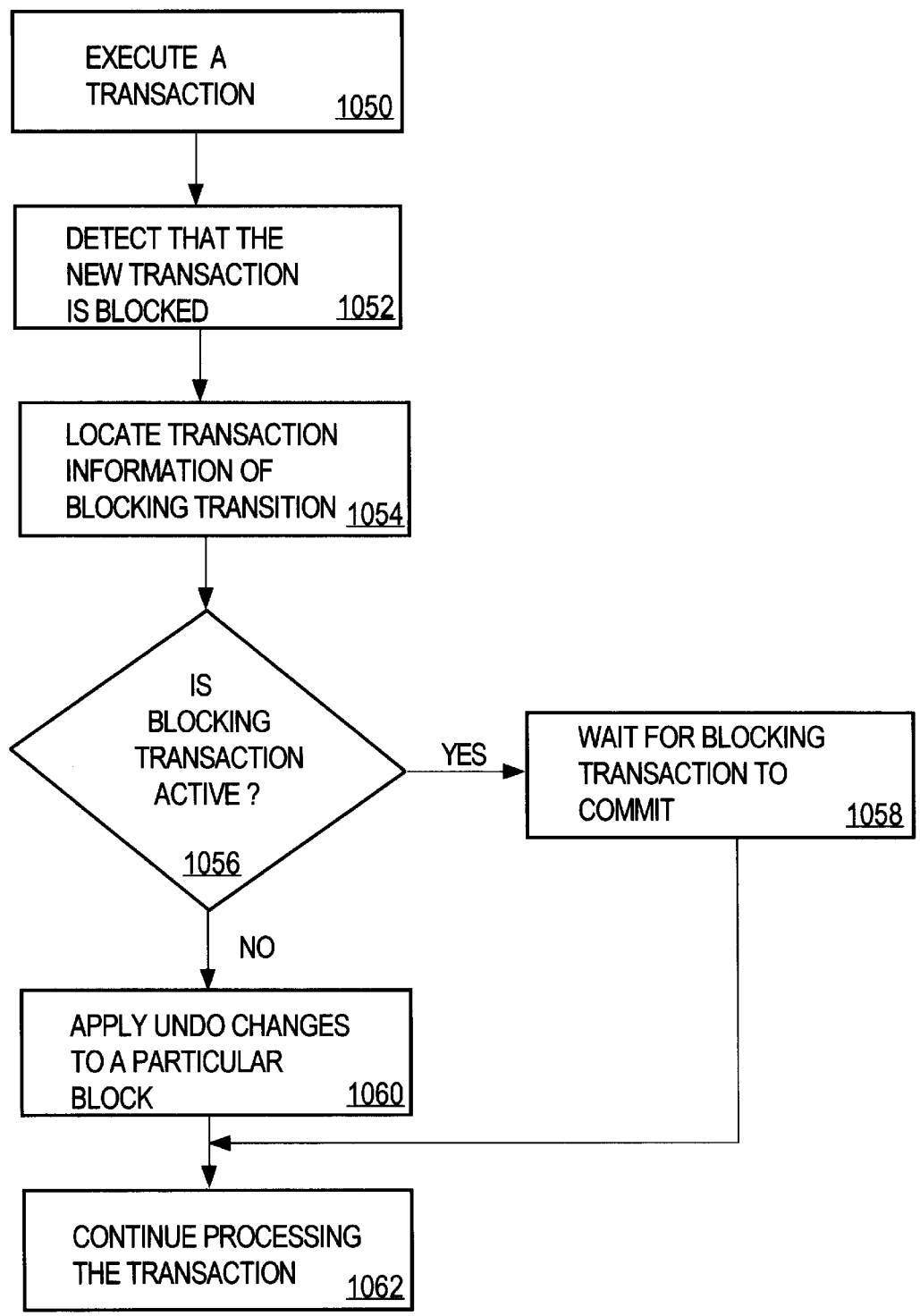
FIG. 10 is a flow diagram illustrating a method for performing row level recovery after a transaction prematurely terminates.

FIG. 10 is a flow diagram illustrating a method for performing a row level recovery after a transaction prematurely terminates. These steps may be performed when a new transaction attempts to a access a particular row in a container that is held by another transaction. In this example, it shall be assumed that the new transaction has attempted to access information contained in row 9 of container 756.

At step 1050, a new transaction is executed. At step 1052, the system detects that a new transaction is blocked. In this example, the detection is achieved when the new transaction attempts to access information contained in row 9 of container 756 which is held by another transaction.

At step 1054, transaction information that corresponds to the blocking transaction is found. In one embodiment of the present invention, the transaction information is in the form of an entry in a transaction table within the container which contains the row of interest.

At step 1056, it is determined, based on the transaction information, whether the blocking transaction is an active transaction or a dead transaction. Determining whether a blocking transaction is an active transaction or a dead transaction can be achieved by reading status information in the transaction table and gaining access to a memory structure indicating that the transaction is still alive. The status information will indicate whether the transaction is active or committed. According to one embodiment, a dead status is indicated by an active status flag in a transaction table of an instance that crashed. If the transaction is dead, then control proceeds to step 1060.

If the transaction is active, then at step 1058, the system waits for the blocking transaction to release its lock. Control then proceeds to step 1062.

At step 1060, the new transaction undoes the changes to the particular row of the container that is held by the blocking transaction. To undo the changes, the new transaction retrieves the undo records that contain changes for the particular row that is locked by the blocking transaction. After the undo records are retrieved, the operations that correspond to the particular row of interest are executed and the lock on the particular row is released. In certain embodiments, each undo record contains an applied flag for each change that was made to a particular row. The applied flags indicate whether changes contained in an undo record for a particular row have previously been applied to the corresponding container. Once the changes contained in an undo record for the particular row has been applied, the corresponding applied flag is set to indicate the changes have been applied.

In this example, the undo pointer associated with entry 1022 of container 756 is used to locate the undo record 1002 which contains the most recent changes to container 756 that were caused by the blocking transaction. The operations in undo record 1002 are then checked to determine if they contain changes that correspond to the particular row of interest (row 9). In this example, undo record 1002 contains a change that corresponds to the particular row of interest (row 9). The operations contained in the changes for row 9 are then applied and the applied flag is updated to indicate that the changes to row 9 have been applied in undo record 1002.

The prior block change pointer of undo record 1002 is then used to access undo record 1004 which contains the next most recent changes to container 756. In this example, the undo record 1004 does not contain changes that correspond to the particular row of interest (row 9). Therefore, the prior block change pointer of undo record 1004 is used to access undo record 1006 which contains the next most recent changes to container 756.

In this example, undo record 1006 contains a change that corresponds to the particular row of interest (row 9). The operations contained in the changes for row 9 are then applied. Because undo record 1006 is the last undo record associated with container 756 for entry 1022, row 9 of container 756 has been recovered.

At step 1062, the new transaction accesses the resource and continues processing the transaction.

Row Migration

In one embodiment, the containers are represented in a B-tree index. The B-tree index is associated with key values that can be used to locate a particular container. One mechanism by which a B-tree index can be constructed for maintaining containers or data blocks of a database is described in detail in U.S. patent application "Method and Mechanism for Retrieving Values from a Database", having Ser. No. 09/103,159, filed Jun. 25, 1998.

In certain cases, rows of data within a first container can migrate into a second container. For example, the rows of a particular container used as a node of a B-tree index may be split into two separate containers during re-balancing of the index. This tends to complicate recovery operations, because the data container that was changed to generate an undo record is not necessarily the same data container to which the undo record must be applied during recovery.

Figures 1, 11:
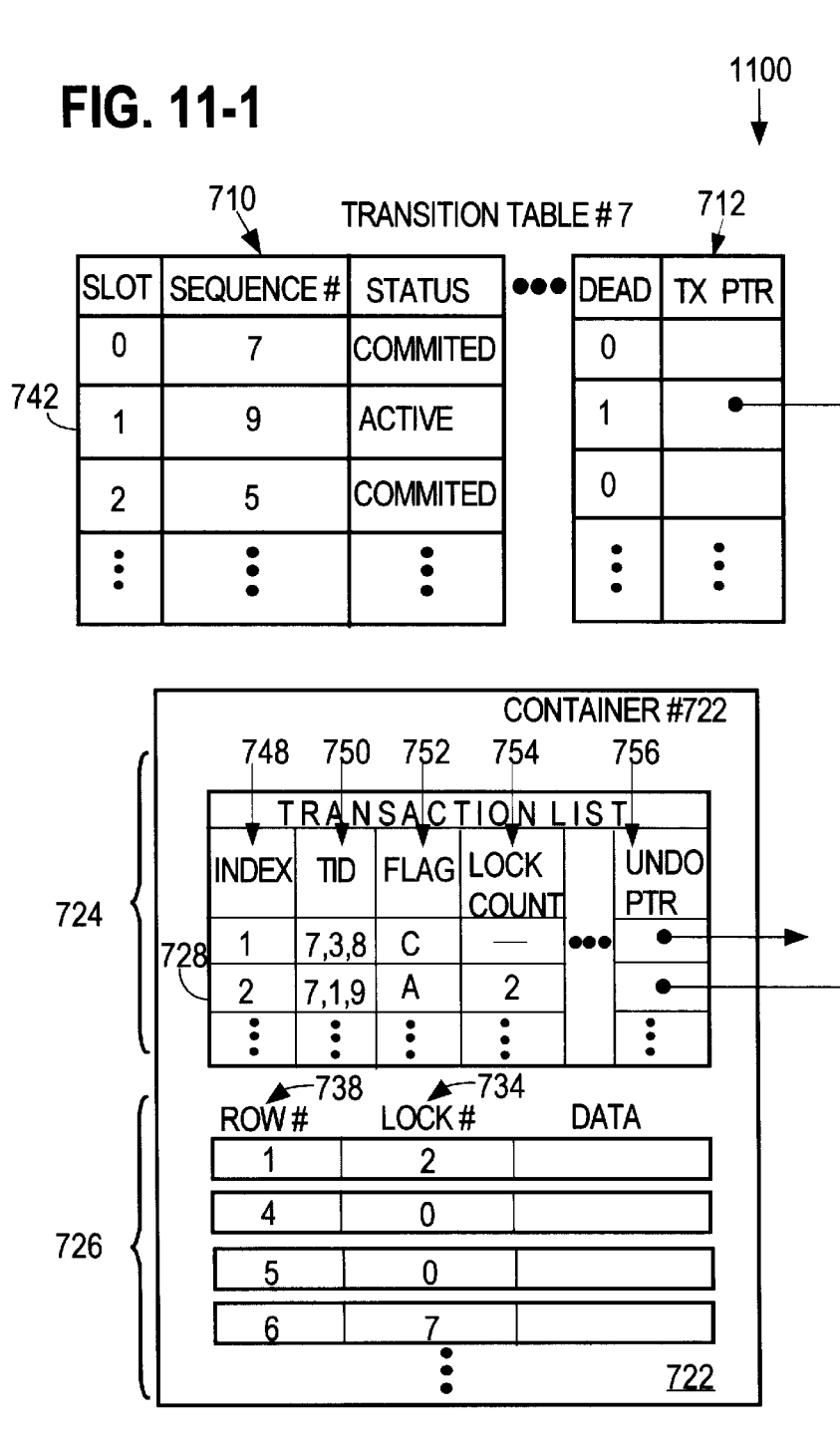
FIG. 11 depicts a system which illustrates the migration of rows from a first block into a second in accordance with an embodiment of the invention.
Figures 2, 11:
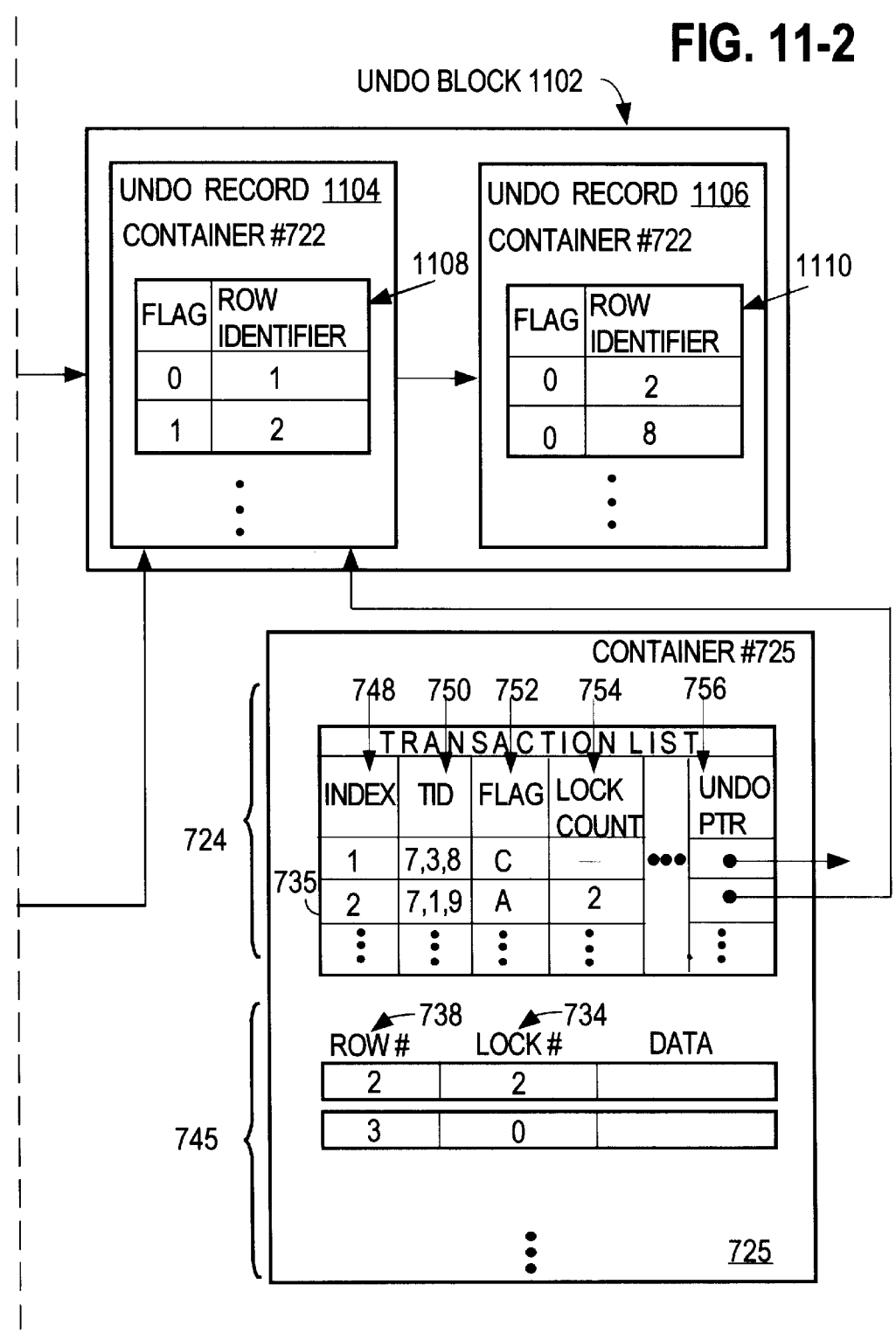

When a row migrates from a first container to second container, the information in the transaction list section of the first container is copied into the second container. For example, FIG. 11 depicts the migration of two rows from container 722 to container 725. In migrating the rows, transaction list section 724 in container 722 is copied into container 725. By copying the transaction list information from the first container into the second container, block level recovery can be performed on both containers, as shall be described in greater detail with reference to FIG. 11.

In certain embodiments, a row identifier list is maintained in each undo record. The row identifier list of an undo record identifies the rows that are associated with the changes in the undo record. For example, a row identifier list 1108 is maintained in undo record 1104. Row identifier list 1108 contains entries that indicate that rows "1", "2" and "3" are associated with the changes in the undo record 1104. In certain embodiments, applied flags are maintained in each undo record and are used to indicate whether changes for a particular row have been applied.

FIG. 11 depicts a system 1100 which illustrates the migration of rows from a first container into a second in accordance with an embodiment of the invention. FIG. 11 is similar to FIG. 7A and therefore like components have been numbered alike.

As shown in FIG. 11, rows 2 and 3 in data section 726 of container 722 have migrated to data section 745 of container 725. Transaction list selection 724 has been copied from container 722 into container 725. In this example, an undo block 1102 contains two undo records 1104 and 1106. The undo pointer of entry 728 in container 722 and the undo pointer of entry 735 of container 725 both point to undo record 1104 which contains the most recent changes made by transaction "7,1,9" to both containers 722 and 725. Undo records 1104 and 1106 are respectively associated with row identifier lists 1108 and 1110. The row identifier lists 1108 and 1110 identify a list of rows for which undo changes reside in undo records 1104 and 1106, respectively.

For example, row identifier list 1108 indicates that the undo information contained in undo record 1104 applies to rows "1", "2" and "3". Similarly, the row identifier list 1106 indicates that the undo information contained in undo record 1104 applies to rows "2" and "8".

In certain embodiments, a bitmap is associated with an undo record and is used to indicate whether changes within the undo record have been applied to corresponding rows. Each time an undo change is applied to a particular row, the bitmap is updated to identify the changes have been applied to the particular row. In the illustrated embodiment, an applied flag that is used to indicate whether the undo changes in the undo record have been applied to a particular row is associated with each entry in row identifier lists 1108 and 1110.

Figure 12:
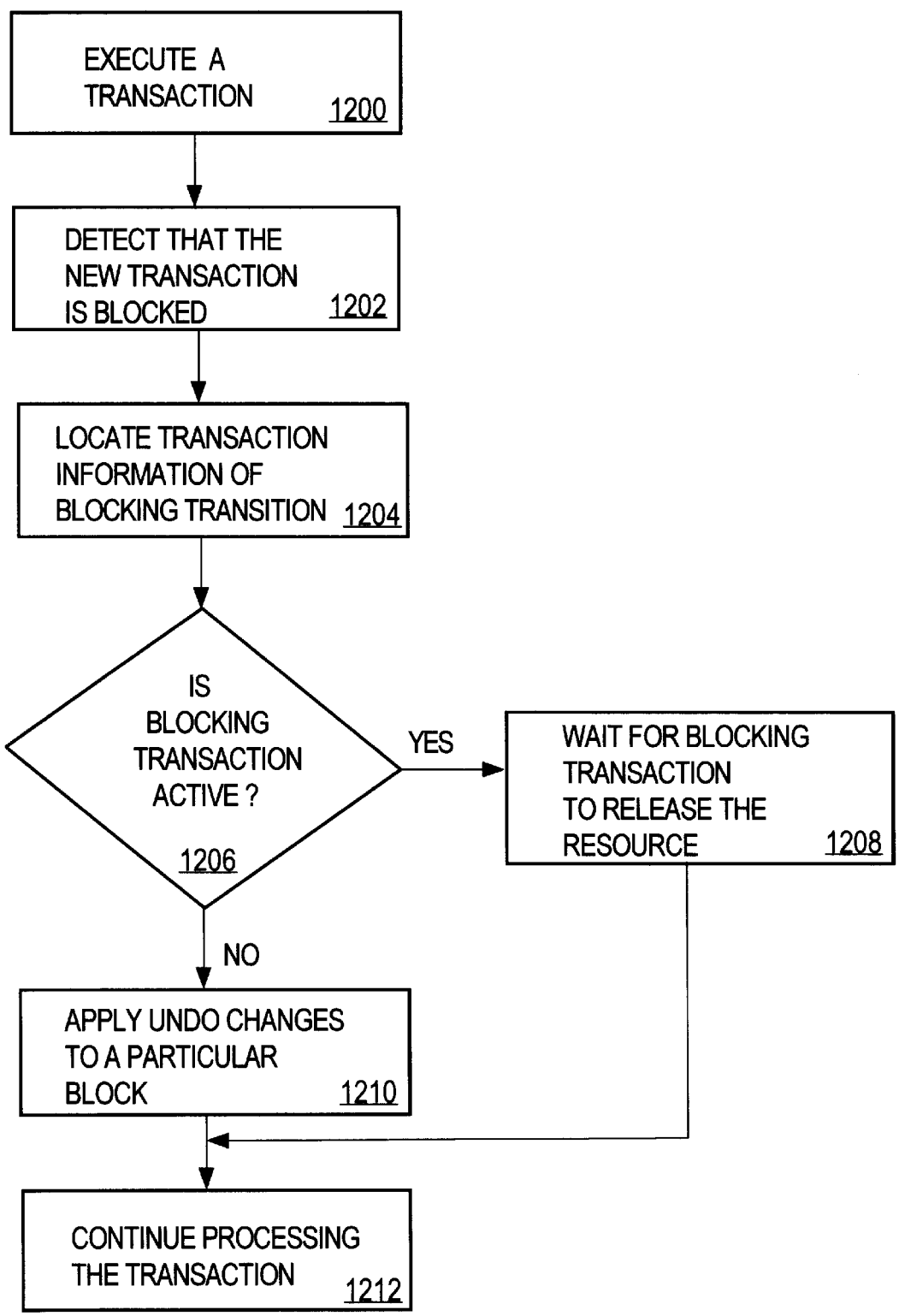
FIG. 12 is a flow diagram illustrating a method that allows for recovering after a row migrates from one block to another in accordance with an embodiment of the invention.

FIG. 12 is a flow diagram illustrating a method for performing a block level recovery after the migration of rows from one container to another in accordance with an embodiment of the invention. In this example, it shall be assumed that that rows 2 and 3 have migrated from container 722 into container 725 and that a new transaction has attempted to access information in row 2 after row 2 migrated to container 725. It shall also be assumed that changes for row 2 are contained in both undo record 1104 and 1106.

At step 1200, a new transaction is executed. At step 1202, the system detects that a new transaction is blocked. In this example, the detection is achieved when the new transaction attempts to access information in row 2 of container 725 which is held by another transaction.

At step 1204, transaction information that corresponds to the blocking transaction is found. In one embodiment of the present invention, the transaction information is in the form of an entry in a transaction table such as entry 742 in transaction table 710. As explained above, the transaction table 710 includes entries, each of which corresponds to and reflects the current state of a transaction in an instance.

At step 1206, it is determined, based on the transaction information, whether the blocking transaction is an active transaction or a dead transaction. This determination can be achieved by reading status information in the transaction table and gaining access to a memory structure indicating that the transaction is still alive. The status information will indicate whether the transaction is active or committed. According to one embodiment, a dead status is indicated by an active status flag in a transaction table of an instance that crashed. If the transaction is dead, then control proceeds to step 1210.

If the transaction is active, at step 1208, the system waits for the blocking transaction to release its lock. Control then proceeds to step 1212.

At step 1210, the new transaction undoes the changes to the particular container that contains the row that is held by the blocking transaction. To undo the changes, the new transaction retrieves the undo record that contains the most recent changes for the particular data container that contains the row held by the blocking transaction ("container of interest"). After the undo record is retrieved, the row identifier list of the undo record is used to identify the changes (rows) that are associated with the container of interest. The changes for the rows associated with the container of interest are then applied to the container of interest.

In certain embodiments, an applied flag is associated with each row in the row identifier list that is used to indicate whether the changes in the undo record have been applied to a particular row of a particular container. Once the changes contained in an undo record have been applied, the corresponding flags are set to indicate that the changes have been applied. The pointer to the next container undo is then used to obtain a previous undo record if it exists. If a previous undo record exists, the sequence is repeated for that container.

In this example, the undo pointer 756 in entry 735 of transaction list sections 724 is used to locate undo record 1104 which contains the most recent changes to the container 725. The rows in the row identifier list 1108 are then compared with the rows in container 725 to identify the changes that need to be applied to container 725. In this example, because rows 2 and 3 have migrated to container 725, rows 2 and 3 are identified as residing in container 725. Therefore, the undo changes in undo record 1104 for rows 2 and 3 are applied to container 725 and the corresponding flags are updated to indicate that the changes have been applied.

The prior block change pointer is then used to update the undo pointer associated with entry 735 in container 725 to access undo record 1106. However, the undo pointer associated with entry 728 in container 722 is not updated as the changes in undo record 1104 that correspond to container 722 have not yet been applied.

The rows in the row identifier list 1110 are then compared with the rows in container 725 to identify the changes that need to be applied to container 725. In this example, row 2 is identified as residing in both container 725 and row identifier list 1110. Therefore, the undo changes in undo record 1110 for rows 2 are applied to container 725 and the corresponding flag is updated to indicate that the changes have been applied. In this example, because there are no other undo records associated with container 725, all undo changes for row 2 have been applied and therefore the lock held by the dead transaction on row 2 can be removed.

At step 1212, the new transaction accesses the resource and continues processing the transaction.

It should be noted that although the simplified example depicted undo changes being applied to on a block level basis, in certain embodiments, recovery is performed at the row level such that only those changes that correspond to rows that are of interest to the new transaction are applied to the corresponding containers. For example, instead of applying undo changes for both rows 2 and 3, only the changes row 2 are applied to container 725 as it is the row that is needed by the new transaction.

CONCURRENCY CONTROL

Before a recovery process can perform a block level recovery on a particular dead transaction, the process must first obtain an exclusive lock to prevent two separate processes from performing recovery on the same container at the same time. Thus, a process wanting to perform recovery on a dead transaction must first obtain an exclusive lock on the undo records that are held by the dead transaction. The exclusive lock prevents other processes from concurrently recovering the same undo record at the same time.

In certain embodiments, a global recovery lock is provided that allows only a single process to perform recovery on a dead transaction at any point in time. When a process needs to recover a particular dead transaction, the process first requests a global recovery lock for the particular dead transaction. Once the process obtains the global recovery lock for the particular dead transaction, the process may begin to perform block level recovery on the transaction records of the dead transaction. After the process has completed the block level recovery, the global recovery lock for the particular dead transaction is released.

In using the block level recovery mechanism, a new transaction that encounters a rowlock held by a dead transaction does not have to wait until the dead transaction is fully recovered before it can proceed. Instead, by applying block level recovery, the new process need only wait for those undo records that contain changes to the particular block of interest to be applied before it is allowed to continue processing.

In certain embodiments, a row level recovery mechanism is provided which allows recovery to be performed at the row level. By applying row level recovery, the new process need only wait for changes to the particular row of interest to be applied before it is allowed to continue processing.

Although the previous examples have depicted the transaction list sections as being contained within a corresponding container, in some cases the transaction list sections may actually be maintained outside the corresponding container.

PARALLEL RECOVERY

The previous examples provide a mechanism that allows a particular resource that is held by a dead transaction to be recovered without having to first recover other resources held by the dead transaction that are not currently of interest. However, under some conditions, it may still be desirable to roll back an entire dead transaction. When rolling back a dead transaction, invoking a single process to perform the roll back can induce a bottleneck in the system as recovery of resources held by the dead transaction is forced to be performed serially.

Even in the per-block rollback context, several of the resources held by a dead transaction may be required by a particular new transaction. It may be inefficient to roll back the resources desired by the new transaction in a serial manner. If recovery of the desired resources is performed serially, the new transaction will be required to wait longer than if the resources where recovered in parallel. In addition, because a typical database system may contain a large number of processes executing multiple new transactions, invoking a single recovery process to serially recovery needed resources can cause the new transactions to wait an unreasonably long period of time.

To increase the speed of recovery when more than one resource held by a dead transaction needs to be recovered, a parallel recovery mechanism is provided that allows the recovery of resources in parallel. In one embodiment, multiple threads of recovery are extracted from a dead transaction by identifying a plurality of resources that can be recovered in parallel. The plurality of resources are assigned to a plurality of recovery processes, hereafter known as recovery slaves, which are used to recover the plurality of resources in parallel. For explanation purposes, the recovery of resources in parallel shall be described at the data block resource level.

Figure 13:
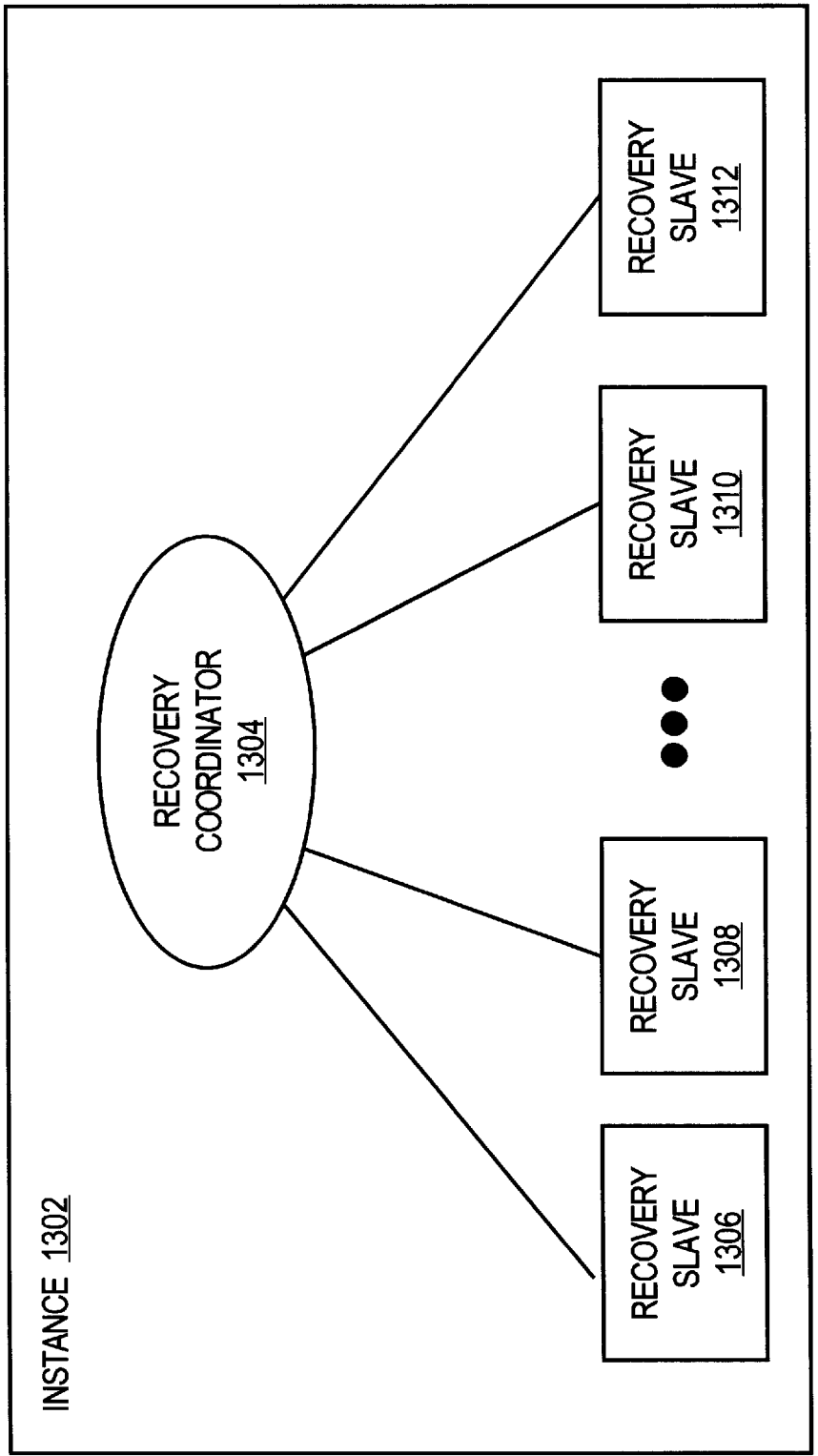
FIG. 13 depicts a parallel recovery system according to certain embodiments of the invention.

FIG. 13 depicts a parallel recovery system 1300 according to certain embodiments of the invention. In this example parallel recovery system 1300 includes an instance 1302 that contains a recovery coordinator 1304 and a plurality of recovery slaves 1306–1312. The recovery coordinator 1304 is responsible for extracting the parallelism within a dead transaction. The phrase "extracting the parallelism within a dead transaction" refers to the act of determining sets of changes made by the dead transaction that can be removed in parallel without affecting the integrity of the database.

The recovery coordinator 1304 extracts the parallelism within a dead transaction by determining sets of undo records can be recovered in parallel. In determining groups of undo records that can be recovered in parallel, the recovery coordinator 1304 identifies any dependencies that may exist between the undo records that are associated with the dead transaction. The recovery coordinator 1304 then assigns the groups of undo records to the plurality of recovery slaves 1306–1312. Once assigned, the plurality of recovery slaves 1306–1312 apply the assigned undo records to the corresponding data to be recovered.

DETERMINING DEPENDENCIES

Dependencies may exist between the undo records associated with a dead transaction. Because of the dependencies, certain undo records must be applied in a particular order relative to each other. For example, undo record dependencies may occur as a result of a transaction performing multiple modifications to the same row in a particular data block, inserting a row into a data block and then modifying the row, or deleting a row in a data block and then inserting something into the space previously occupied by the row that was deleted.

The recovery coordinator 1304 identifies sets of non-interfering undo records by assigning a "seed" to each undo record of a dead transaction. In this context, a seed is an identifier or flag value. All undo records that depend on each other are assigned the same seed. After the seeds have been assigned, each undo record is hashed into a particular bucket (slot) in an undo hash table based on the seed that was assigned. The undo record is then inserted (linked) into a particular undo record hash chain that is associated with the particular slot. The number of slots that are contained in an undo hash table is based on the number of recovery slaves that are to be used in recovering the dead transactions. Thus, the step of hashing undo records to a particular slot effectively assigns the undo sets to a particular recovery slave.

Figure 14A:
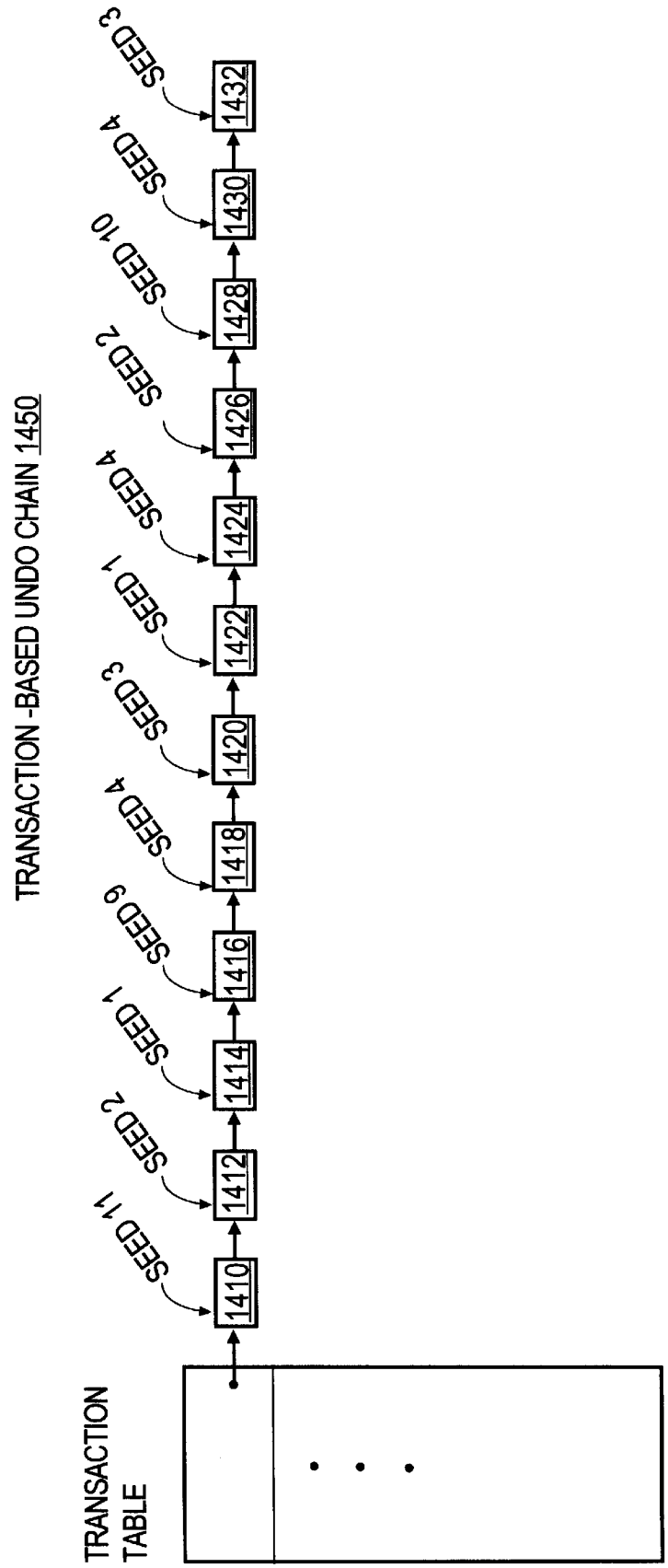
FIG. 14A illustrates the assigning of seeds to undo records contained in a transaction-based undo chain according to an embodiment of the invention.

FIG. 14A illustrates the assigning of seeds to undo records contained in a transaction-based undo chain 1450 according to an embodiment of the invention. In this example, the undo records 1410–1432 contain change information that corresponds to changes that were made by a transaction that has died (i.e. a dead transaction). As depicted, a particular seed is assigned to each of the undo records 1410–1432 to identify sets of non-interfering undo records. Thus, undo records that have dependencies between each other are assigned the same seed. For example, because undo records 1418, 1424 and 1430 contain dependencies between each other, they have all been assigned a seed of "4". There are several methods for determining whether dependencies exist between the undo records that are associated with a dead transaction. According to one method, the seed that is assigned to an undo record is based on the container number that is contained in the undo record. As previously indicated, the container number represents the address of the data block for which the changes in the undo record corresponded at the time the undo record was generated. By using the corresponding data block addresses as the seed for the undo records, all undo records that contain change information for a particular data block are hashed into the same slot and are therefore linked into the same undo record hash chain in the same relative order that they had in the transaction undo chain.

Figure 14B:
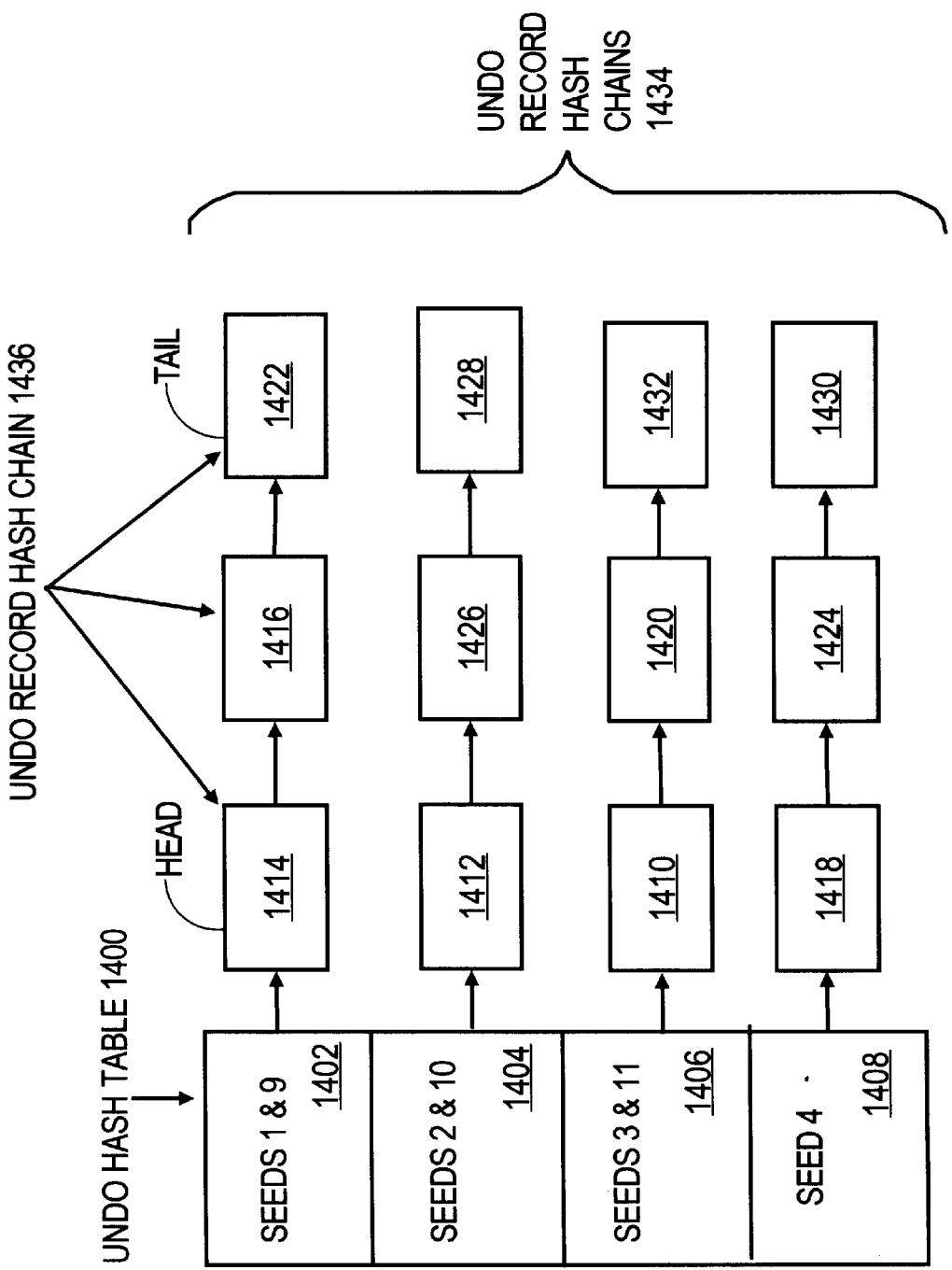
FIG. 14B illustrates the hashing and linking of undo records based on their assigned seeds according to certain embodiments of the invention.

Once the seeds are assigned, the undo records are hashed into a particular slot in an undo hash table based on the their assigned seeds and linked into the undo record hash chain that is associated with the particular slot. FIG. 14B illustrates the hashing and linking of undo records 1410–1432 based on their assigned seeds according to certain embodiments of the invention. An undo hash table 1400 contains a plurality of slots 1402–1408 that connect to a plurality of undo record hash chains 1434. The number of slots that are contained in the undo hash table 1400 is based on the number of recovery slaves that have been assigned the job of applying the undo records that are hashed to a particular slot. In this example, four recovery slaves have been assigned the job of applying the undo records 1410–1432 that have hashed into the slots of undo hash table 1400.

As previously stated, after the seeds have been assigned, the transaction-based undo chain 1450 is scanned and each undo record is hashed into a particular slot in the undo hash table 1400 based on the seed it was assigned. The undo record is then linked into a particular undo record hash chain that is associated with the particular slot. In order to maintain the sequential order of undo records that do depend on each other, the transaction-based undo chain 1450 is scanned in a sequential order to allow undo records to be inserted into their corresponding undo record hash chains in a sequential order that will maintain the appropriate dependencies. For example, by sequentially scanning the transaction-based undo chain 1450 starting with undo record 1410, the undo records 1414, 1416 and 1422 which have respectfully been assigned seeds of "1", "9" and "1", are hashed into slot 1402 of undo hash table 1400 and linked into undo record hash chain 1436 such that the correct ordering is maintained.

In certain embodiments, to maintain a correct ordering of the changes that were caused by the dead transaction, undo records are linked into the tails of the undo record hash chains as they are inserted into the appropriate hash buckets. It should be noted that establishing the links that insert an undo record into an undo hash chain do not affect other links that may currently exist for the undo record.

Once the undo records are linked into the undo record hash chains 1434, a recovery slave is assigned to each undo record hash chain. The recovery coordinator is responsible for assigning a particular recovery server to each of the undo record hash chains. Once assigned, the recovery slaves apply the undo records of the undo record hash chain that they have been assigned. The undo records of a particular undo record hash chain are applied by the assigned recovery slave in a particular order such that dependencies between the undo records within the undo record hash chain are maintained. By applying the undo change information in parallel, data blocks (resources) can be recovered in parallel. Even within a single transaction (intra transaction parallel recovery).

To reduce the delay associated with recovery, recovery slaves may be assigned undo record hash chains and begin recovery of undo records in the undo record hash chains before all of the undo records have been linked into in the undo record hash chains. In one embodiment, the enqueuing and dequeuing of undo records into undo record hash chains are "pipelined" by using a large buffer.

The recovery coordinator may also assign itself to a particular undo record hash chain. The recovery coordinator then applies the change information that is contained in the undo records that are linked in the particular undo record hash chain for which it has been assigned.

As previously stated, each undo record may contain one or more "applied" flags that indicate whether changes for a particular row in the undo record have been applied. When a particular atomic change is applied, the corresponding applied flag is updated to indicate that the change information has been applied. In certain embodiments, recovery slaves are responsible for updating the appropriate applied flags in an undo record whenever changes for a particular row in an undo record are applied.

By maintaining applied flags in the undo records, changes in an undo record can be applied without having to unlink the undo record from its transaction-based undo chain. For example, referring to FIG. 11, if the change information for row "2" in the undo record 1104 is applied, updating the corresponding applied flag in the undo record tells other potential recovery processes that the changes have previously been applied. Thus, the change information in the undo record will not be applied multiple times even though the undo record is not removed right away from the transaction-based undo chain. The actual removal of undo records from the transaction-based undo chain is described below.

Once all change information in an undo record has been applied, the undo record is unlinked from the corresponding undo record hash chain. In certain embodiments, the recovery slave is responsible for unlinking undo records from the undo record hash chains. After removing the undo record from the undo record hash chain, if another undo record exists in the undo record hash chain, the recovery slave begins to apply the change information in the next undo record. It should be noted that removing an undo record from the undo hash chain does not affect other links that may currently exist for the undo record (i.e. transaction-based undo chain links).

GARBAGE COLLECTION

After the change information that is contained in an undo record has been applied, the undo record can be removed from its transaction-based undo chain. The recovery coordinator repeatedly scans the transaction-based undo chains of dead transactions to identify undo records that can be removed. While performing the scans, the recovery coordinator uses the applied flags of each undo record to determine if all change information in a particular undo record have been applied. If the applied flags indicate that all changes in a particular undo record have been applied, the recovery coordinator unlinks the particular undo record from its transaction-based undo chain.

RECOVERY OF MIGRATED ROWS

As previously described, because of row migration, the particular data block for which a particular undo change corresponds may dynamically change. Thus, even though all of the changes reflected in an undo record are for the same data block at the time undo record is created, after time, those same changes may correspond to two or more different data blocks. Consequently, there is no guarantee that the container number contained in an undo record will identify the correct data block for all changes in the undo record at the time recovery is performed. Therefore, because the container number (data block address) may not accurately identify the correct data container for all changes in the undo record, the container number is treated as a "hint" as to which data block the changes correspond, rather than as a conclusive indicator. Thus, in applying the changes for a particular row, the container number in the undo record is first used to locate the particular data block for which the changes correspond. If the container number correctly identifies the data block that contains the corresponding row for which the changes apply, then the row has not previously migrated and thus the changes can be applied to the data block that is identified by the container number. However, if the container number does not identify the correct data block, then the row identifier is used to walk down a tree of containers in order to identify the data block for which the row has migrated. The changes are then applied to the identified data block.

For example, referring to FIG. 11, in order to apply the changes that correspond to row identifier "1" in undo record 1104, the container number "722" is first used as a hint to locate the correct data block. In this example, because row "1" has not previously migrated from the container (data block) "722", the container number "722" correctly identifies the data block that contains the row "1".

Alternatively, in applying the changes that correspond to row identifier "2" in undo record 1104, because row "2" has previously migrated from container "722" to container "725", when the container number "722" is used as a hint to locate the data block that contains row "2", the incorrect data block "722" is identified. Thus, row identifier "2" is used as a key to search a B-tree that contains a corresponding leaf for each of the containers in order to identify the data block that contains row "2". In this example, using row identifier "2" in undo records 1104, the data block 725 is identified in the B-tree as containing the migrated row "2".

PARALLEL RECOVERY OF MIGRATED ROWS

Figure 15:
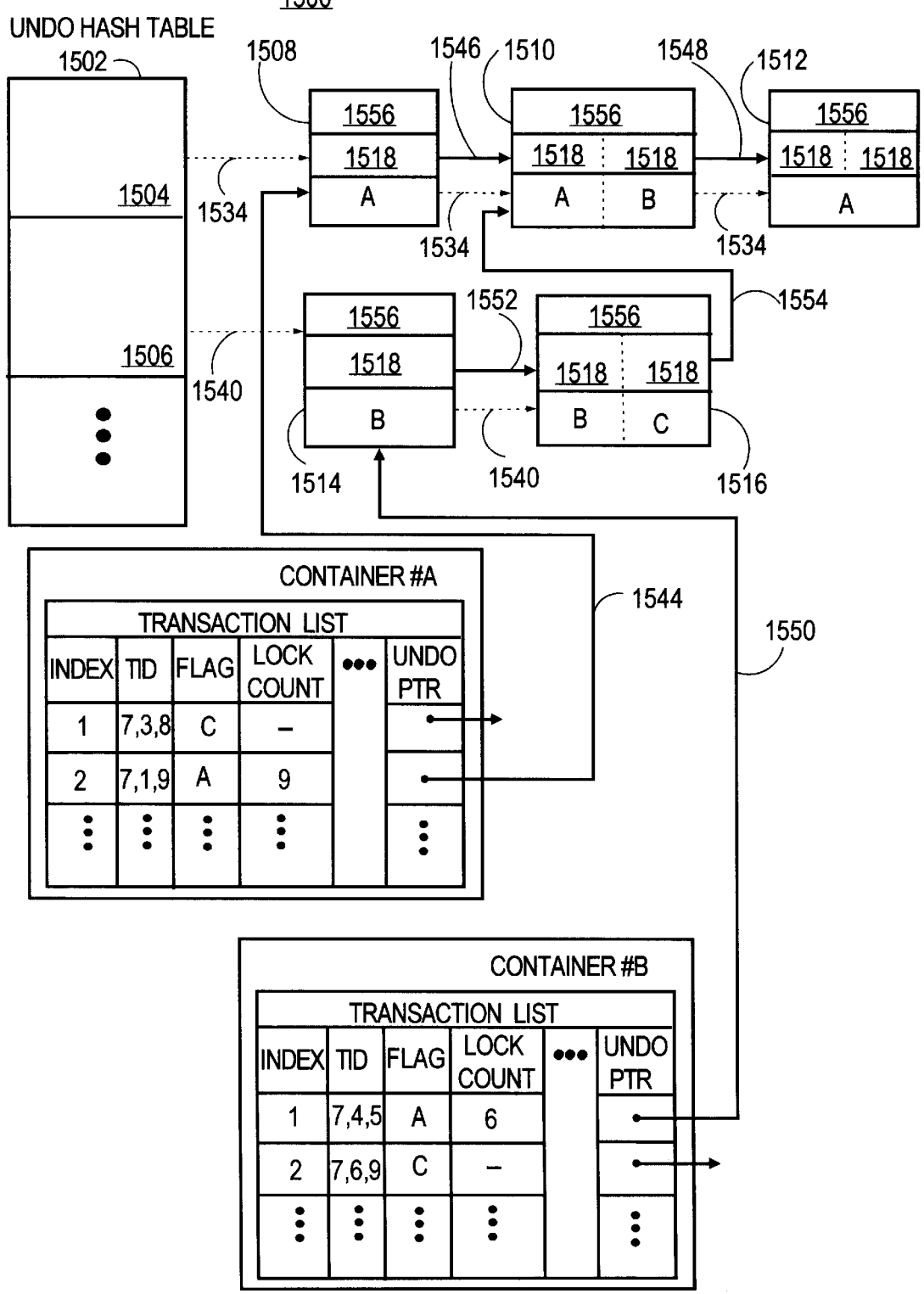
FIG. 15 illustrates a system in which seeds are assigned to undo records to provide hints as to which data block the change information in a particular undo record corresponds.

FIG. 15 illustrates a system 1500 in which the container number in an undo record provides a hint as to which data blocks the change information in a particular undo record corresponds. As depicted in FIG. 15, an undo hash table 1502 contains slots 1504 and 1506 that are respectfully linked to undo record hash chains 1534 and 1540, both being represented by dashed lines. In this example, undo record hash chain 1534 contains undo records 1508, 1510 and 1512. Undo record hash chain 1540 contains undo records 1514 and 1516. Undo records 1508 and 1514 respectfully contain a single atomic change for data container A and data container B. Conversely, undo records 1510, 1512 and 1516 respectfully contain multiple atomic changes for data containers A and B, data container A, and data containers B and C. Associated with each atomic change is an applied flag 1518 that is used to indicate whether the change information for a particular atomic change has been applied. In this example, undo record 1510 contains atomic change information for one or more rows that has migrated from data container A to data container B. Similarly, undo record 1516 contains atomic change information for one or more rows that have migrated from data container B to data container C. As depicted, each undo record also contains a container number 1556 that identifies the data container for which the changes corresponded before the migration of rows. In this example, container number 1556 in undo records 1508, 1510 and 1512 identify data container A while container number 1556 in undo records 1514 and 1516 identify data container B.

Also depicted in FIG. 15 are data container A and data container B. Data container A includes an undo pointer 1544 that is used to point to the current most recent change information (undo record 1508) for data container A. Data container B includes an undo pointer 1550 that is used to point to the current most recent change information (undo record 1514) for data container B. Pointers 1546 and 1548 respectfully point to the second most and third most recent changes (undo records 1510 and 1512) for data container A. Pointers 1552 and 1554 respectfully point to the second most and third most recent changes (undo records 1516 and 1510) for data container B.

Figure 16A:
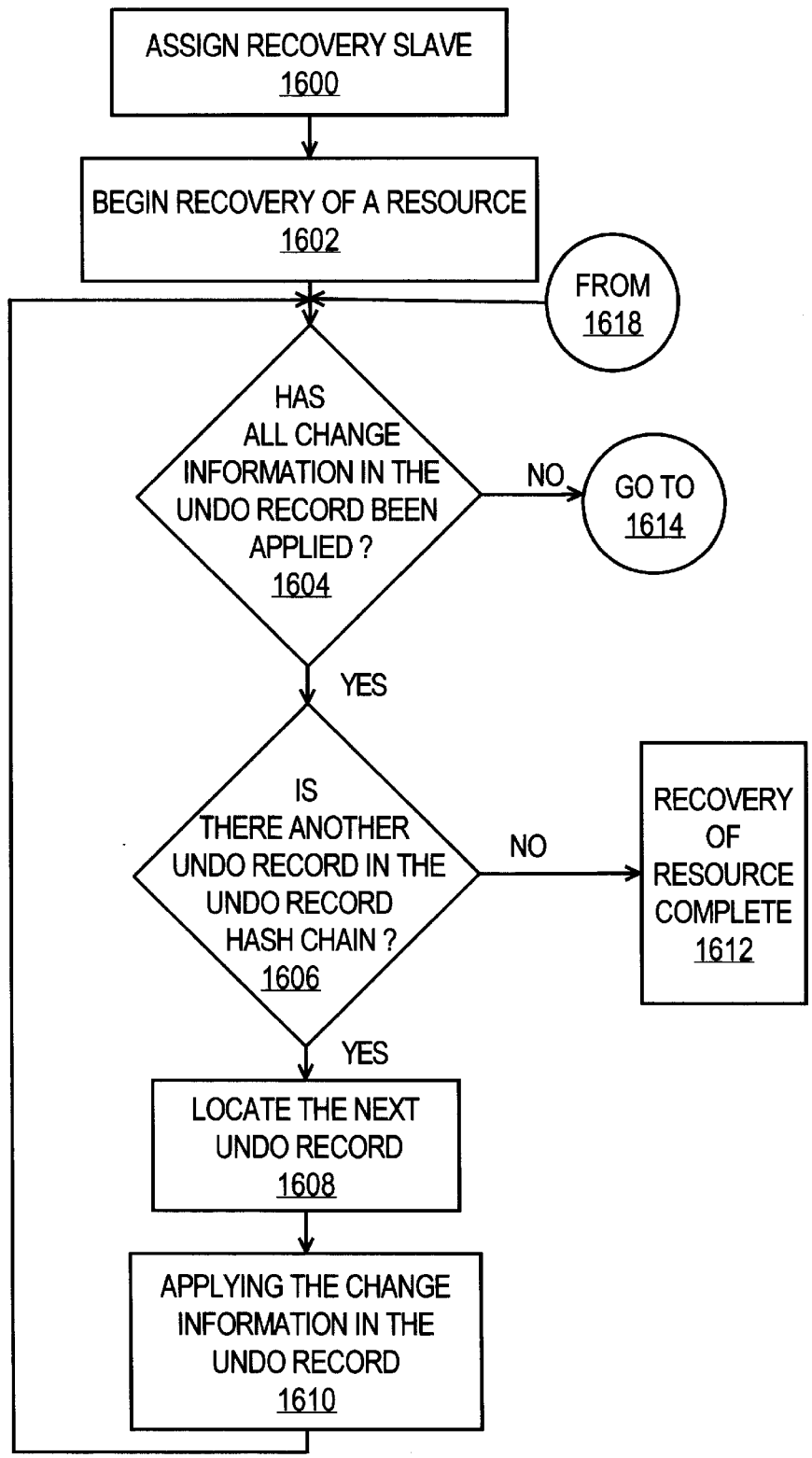
FIG. 16A illustrates a portion of a flow diagram depicting a sequence for recovering a data container using a recovery slave in accordance with an embodiment of the invention.
Figure 16B:
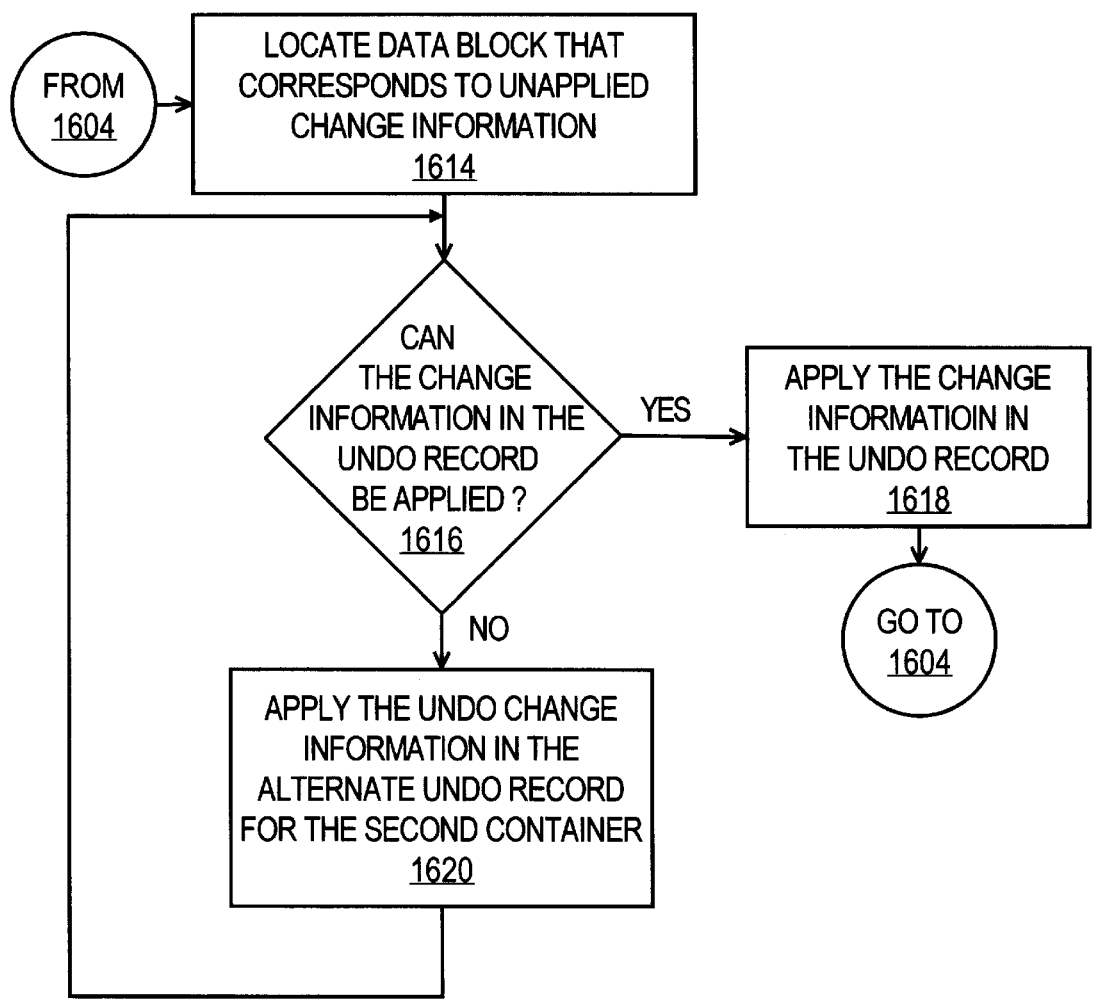
FIG. 16B illustrates another portion of a flow diagram depicting a sequence for recovering a data container using a recovery slave in accordance with an embodiment of the invention.

FIGS. 16A and 16B illustrates a flow diagram depicting a sequence for recovering a data container using a recovery slave in accordance with an embodiment of the invention. FIGS. 16A and 16B will be described in reference to FIG. 15.

At step 1600, a recovery slave is assigned to a slot in an undo hash table in order to process the undo records in the associated undo record hash chain. As previously stated, by assigning seeds to the undo records based on their container number, with the exception of undo records that contain migrated row change information, the undo records for a particular data container will be linked in a particular undo record hash chain. It shall be assumed that the recovery slave is assigned to slot 1504 in undo hash table 1502 in order to process the records in undo record hash chain 1534. It shall also be assumed that the seed for data container A has caused the undo records for data container A to be linked into undo record hash chain 1534.

At step 1602, the recovery slave locates the first undo record in undo record hash chain and begins to apply the change information to the corresponding data container (data container A). Whenever the recovery slave applies the change information for an atomic change it updates the applied flag to indicate the changes has been applied. In this example, the recovery slave locates undo record 1508 in undo record hash chain 1534 and applies the atomic change to data container A. The recovery server then updates applied flag 1518 in undo record 1508 to indicate that the atomic change has been applied.

Whenever an atomic change is applied for a particular data container, the undo pointer in the corresponding data container is automatically updated to point to the undo record that contains the next most recent change information for the data container. For example, when the change information in undo record 1508 is applied to data container A, undo pointer 1544 is updated to point to undo record 1510.

At step 1604, it is determined whether all the changes in the undo record have been applied by examining one or more applied flags contained in the undo record. If all the changes in the undo record have not been applied, then control proceeds to step 1614 to locate the data container that is associated with the changes that have not been applied.

However, if it is determined that all the changes in the undo record have been applied, then at step 1606, it is determined whether there is another undo record in the undo record hash chain that needs to be processed. If it is determined that there is not another undo record in the undo record hash chain that needs to be processed then control proceeds to step 1612 as recovery of the data container (resource) is complete. Conversely, if it is determined that there is another undo record in the undo record hash chain that needs to be processed, then at step 1608 the recovery slave follows the undo record hash chain to locate the next undo record. In certain embodiments, the recovery slave removes undo records from the undo record hash chain after all the changes in the undo record have been applied.

At step 1610, the recovery slave applies the change information in the undo record for the corresponding data container (data container A). Control then proceeds to step 1604 to determines whether all the changes in the undo record have been applied.

At step 1614, a data container that corresponds to unapplied change information in the undo record is identified. In certain embodiments, the container number is used as a hint to identify the data container that corresponds to the change information. In one embodiment, the recovery slave uses the key to locate the corresponding data container. For example, assuming the recovery slave is currently attempting to process the change information for data container B in undo record 1510, the recovery slave uses the container number 1156 in the undo record 1510 as a key to identify data container B as the data container that corresponds to the change information.

At step 1616, the recovery slave determines whether the change information can be applied to a second data container that was identified by the key. Whether the change information can be applied is determined by examining the undo pointer associated with the second data container that was identified by the key. For example, assuming the recovery slave is currently attempting to process the change information for data container B in undo record 1510, the recovery slave determines whether the change information can be applied to the data container B by determining whether undo pointer 1550 points to the undo record 1510. In this example, the undo pointer 1550 currently points to the undo record 1514.

If the undo pointer associated with the second data container is not currently pointing to the undo record that contains the change information, then control proceeds to step 1620 to apply the change information in an alternate undo record that is pointed to by the undo pointer associated with the second data container.

However, if the undo pointer associated with the second data container is currently pointing to the undo record that contains the change information, then at step 1618 the change information is applied and the corresponding applied flag is updated to indicate that the changes have been applied. For example, if the undo pointer 1550 was currently pointing to the undo record 1510, then the change information for data container B in undo record 1510 could be applied to data container B. Control then proceeds to step 1604 to determine whether all the changes in the undo record have been applied.

At step 1620, the recovery slave applies the change information in the alternate undo record that is pointed to by the undo pointer in the second data container and updates the appropriate applied flags. By applying the change information the undo pointer in the alternate data container is automatically updated to point to the undo record that contains the next most recent change information for the alternate data container.

In this example, the recovery slave applies the change information in undo record 1514 to data container B. The undo pointer 1550 in data container B is automatically updated to point to undo record 1516 which contains the next most recent change information for data container B. The applied flag 1518 in undo record 1514 is then updated to indicate that the change information has been applied. Control then proceeds to step 1616 to determine whether the change information can be applied to the second data container that was identified by the key. In this example, control proceeds to step 1616 to determine if the change information for data container B in undo record 1510 can now be applied to the data container B. Because in this example undo pointer 1550 will be currently pointing to undo record 1516 after applying the change information in undo record 1514, it will be determined that the change information for data container B in undo record 1510 can not yet be applied to the data container B.

In certain cases, an alternate undo record may contain change information for multiple data containers that is required to be applied before the change information can be applied to the second data container that was identified by the key. Thus, in certain embodiments, the recovery server repeatedly "chases" a data container's rows as they migrate. In one embodiment, the recovery server repeats steps 1614–1620 in order to apply the necessary change information so that the required change information in the alternate data container can be applied (i.e. goes down all necessary levels). For example, assuming that the change information for data container C in undo record 1554 needs to be applied before the change information for data container B in undo record 1510 can be applied, the recovery slave uses a key in the change information for data container C in undo record 1554 to locate data container C in order to apply the change information. This step is repeated for all undo records and data containers as necessary.

In an alternative embodiment, the recovery slave only goes down a particular number of recovery levels to apply changes. If the recovery slave can not continue processing undo records in the undo record hash chain after recovering the particular number of recovery levels, the recovery slave waits for the necessary change information to be applied by another process (e.g. another recovery slave). For example, assuming that the change information for data container C in undo record 1554 needs to be applied before the change information for data container B in undo record 1510 can be applied, if the number of the recovery levels is set to two (2), the recovery slave waits for another process to apply the change information for data container C in undo record 1554.

In certain embodiments, whenever the recovery slave is required to apply the change information in an undo record that corresponds to an alternate data container, the recovery server attempts to apply the change information for all undo records to completely recover the alternate data container. In one embodiment, the recovery applies only those undo records that are at a particular recovery level. In alternative embodiments, the recovery slave applies only the minimum number of changes to the alternate data container in order to recover the data container.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for removing changes made by a particular transaction, the method comprising the steps of:
    identifying two or more sets of changes made by the particular transaction that can be removed in parallel;
    assigning a corresponding recovery process to each of the two or more sets of changes that can be removed in parallel; and
    undoing changes identified in each of the two or more sets of changes in parallel using the corresponding recovery process.

2. The method of claim 1, wherein the step of identifying two or more sets of changes includes the step of determining dependencies between a plurality of changes, wherein the plurality of changes were made by the particular transaction.

3. The method of claim 1, wherein the step of identifying two or more sets of changes includes the step of determining dependencies between two or more undo records, wherein the two or more undo records contain change information that is associated with a plurality of data blocks.

4. The method of claim 1, wherein the step of identifying two or more sets of changes includes the step of identifying two or more sets of undo records that contain change information that can be applied to data blocks in parallel.

5. The method of claim 4, further comprising the step of generating a plurality of undo record hash chains, wherein each of the plurality of undo record hash chains links undo records that correspond to one of the two or more sets of undo records.

6. The method of claim 4, wherein the step of identifying two or more sets of undo records includes the steps of:
    assigning a particular seed to each of a plurality of undo records that are associated with the transaction, wherein the particular seed is based on which resource is associated with the change information that is contained in each of the plurality of undo records; and
    linking each of the plurality of undo records into a particular undo record hash chain based on the particular seed that is assigned to each of the plurality of undo records.

7. The method of claim 1, wherein the step of assigning the corresponding recovery process comprises the steps of:
    assigning a first recovery process to a first undo record hash chain, wherein the first undo record hash chain links undo records that contain change information that is associated with a first set of changes made by the particular transaction; and
    assigning a second recovery process to a second undo record hash chain, wherein the second undo record hash chain links undo records that contain change information that is associated with a second set of changes made by the particular transaction,
    wherein the first set of changes and the second set of changes can be removed in parallel.

8. The method of claim 1, wherein the step of undoing changes includes the step of applying change information in two or more undo records in parallel, wherein the two or more undo records contain change information for removing changes made by the particular transaction.

9. The method of claim 1, wherein the step of identifying two or more sets of changes that can be removed in parallel includes the steps of:
    identifying a first set of undo records, wherein the first set of undo records contain a first set of change information for removing changes made by the particular transaction; and
    identifying a second set of undo records, wherein the second set of undo records contain a second set of change information for removing changes made by the particular transaction,
    wherein the first set of change information and the second set of change information can be applied in parallel to remove changes made by the particular transaction.

10. A computer-readable medium carrying one or more sequences of one or more instructions for removing changes made by a particular transaction, the one or more sequences of one or more instructions including instructions which, when executed by one or more processors, cause the one or more processors to perform the steps of:
    identifying two or more sets of changes made by the particular transaction that can be removed in parallel;
    assigning a corresponding recovery process to each of the two or more sets of changes that can be removed in parallel; and
    undoing changes identified in each of the two or more sets of changes in parallel using the corresponding recovery process.

11. The computer-readable medium of claim 10, wherein the step of identifying two or more sets of changes includes the step of determining dependencies between a plurality of changes, wherein the plurality of changes were made by the particular transaction.

12. The computer-readable medium of claim 10, wherein the step of identifying two or more sets of changes includes the step of determining dependencies between two or more undo records, wherein the two or more undo records contain change information that is associated with a plurality of data blocks.

13. The computer-readable medium of claim 10, wherein the step of identifying two or more sets of changes includes the step of identifying two or more sets of undo records that contain change information that can be applied to data blocks in parallel.

14. The computer-readable medium of claim 13, further comprising instructions for performing the step of generating a plurality of undo record hash chains, wherein each of the plurality of undo record hash chains links undo records that correspond to one of the two or more sets of undo records.

15. The computer-readable medium of claim 13, wherein the step of identifying two or more sets of undo records includes the steps of:
    assigning a particular seed to each of a plurality of undo records that are associated with the transaction, wherein the particular seed is based on which resource is associated with the change information that is contained in each of the plurality of undo records; and
    linking each of the plurality of undo records into a particular undo record hash chain based on the particular seed that is assigned to each of the plurality of undo records.

16. The computer-readable medium of claim 10, wherein the step of assigning the corresponding recovery process comprises the steps of:

assigning a first recovery process to a first undo record hash chain, wherein the first undo record hash chain links undo records that contain change information that is associated with a first set of changes made by the particular transaction; and assigning a second recovery process to a second undo record hash chain, wherein the second undo record hash chain links undo records that contain change information that is associated with a second set of changes made by the particular transaction, wherein the first set of changes and the second set of changes can be removed in parallel.

17. The computer-readable medium of claim 10, wherein the step of undoing changes includes the step of applying change information in two or more undo records in parallel, wherein the two or more undo records contain change information for removing changes made by the particular transaction.

18. The computer-readable medium of claim 10, wherein the step of identifying two or more sets of changes that can be removed in parallel includes the steps of:

identifying a first set of undo records, wherein the first set of undo records contain a first set of change information for removing changes made by the particular transaction; and identifying a second set of undo records, wherein the second set of undo records contain a second set of change information for removing changes made by the particular transaction, wherein the first set of change information and the second set of change information can be applied in parallel to remove changes made by the particular transaction.

19. A system for removing changes made by a particular transaction, the system comprising:

a memory;

one or more processors coupled to the memory; and a set of computer instructions contained in the memory, the set of computer instructions including computer instructions which when executed by the one or more processors, cause the one or more processors to perform the steps of:

identifying two or more sets of changes made by the particular transaction that can be removed in parallel;

assigning a corresponding recovery process to each of the two or more sets of changes that can be removed in parallel; and undoing changes identified in each of the two or more sets of changes in parallel using the corresponding recovery process.

20. The system of claim 19, wherein the step of identifying two or more sets of changes includes the step of determining dependencies between a plurality of changes, wherein the plurality of changes were made by the particular transaction.

21. The system of claim 19, wherein the step of identifying two or more sets of changes includes the step of determining dependencies between two or more undo records, wherein the two or more undo records contain change information that is associated with a plurality of data blocks.

22. The system of claim 19, wherein the step of identifying two or more sets of changes includes the step of identifying two or more sets of undo records that contain change information that can be applied to data blocks in parallel.

23. The system of claim 22, further comprising the step of generating a plurality of undo record hash chains, wherein each of the plurality of undo record hash chains links undo records that correspond to one of the two or more sets of undo records.

24. The system of claim 22, wherein the step of identifying two or more sets of undo records includes the steps of:

assigning a particular seed to each of a plurality of undo records that are associated with the transaction, wherein the particular seed is based on which resource is associated with the change information that is contained in each of the plurality of undo records; and linking each of the plurality of undo records into a particular undo record hash chain based on the particular seed that is assigned to each of the plurality of undo records.

25. The system of claim 19, wherein the step of assigning the corresponding recovery process comprises the steps of:

assigning a first recovery process to a first undo record hash chain, wherein the first undo record hash chain links undo records that contain change information that is associated with a first set of changes made by the particular transaction; and assigning a second recovery process to a second undo record hash chain, wherein the second undo record hash chain links undo records that contain change information that is associated with a second set of changes made by the particular transaction, wherein the first set of changes and the second set of changes can be removed in parallel.

26. The system of claim 19, wherein the step of undoing changes includes the step of applying change information in two or more undo records in parallel, wherein the two or more undo records contain change information for removing changes made by the particular transaction.

27. The system of claim 19, wherein the step of identifying two or more sets of changes that can be removed in parallel includes the steps of:

identifying a first set of undo records, wherein the first set of undo records contain a first set of change information for removing changes made by the particular transaction; and identifying a second set of undo records, wherein the second set of undo records contain a second set of change information for removing changes made by the particular transaction, wherein the first set of change information and the second set of change information can be applied in parallel to remove changes made by the particular transaction.

* * * * *